United States Patent
Wu et al.

(10) Patent No.: US 11,883,751 B2
(45) Date of Patent: Jan. 30, 2024

(54) VIRTUAL SCENE DISPLAY METHOD, ELECTRONIC DEVICE, AND STORAGE MEDIUM

(71) Applicant: Tencent Technology (Shenzhen) Company Limited, Guangdong (CN)

(72) Inventors: Shuohuan Wu, Guangdong (CN); Zhihong Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 98 days.

(21) Appl. No.: 17/244,446

(22) Filed: Apr. 29, 2021

(65) Prior Publication Data
US 2021/0245062 A1    Aug. 12, 2021

Related U.S. Application Data

(63) Continuation of application No. PCT/CN2020/072853, filed on Jan. 17, 2020.

(30) Foreign Application Priority Data

Feb. 26, 2019    (CN) .......... 201910143280.4

(51) Int. Cl.
*A63F 13/837*    (2014.01)
*A63F 13/219*    (2014.01)
(Continued)

(52) U.S. Cl.
CPC .......... *A63F 13/837* (2014.09); *A63F 13/219* (2014.09); *A63F 13/24* (2014.09);
(Continued)

(58) Field of Classification Search
CPC .... A63F 13/837; A63F 13/219; A63F 13/426; A63F 13/52; A63F 13/422; A63F 13/53; A63F 13/2145
See application file for complete search history.

(56) References Cited

U.S. PATENT DOCUMENTS 9,004,997 B1 *    4/2015  Prosin ................... A63F 13/837
                                                463/2
9,149,720 B2 *   10/2015  Sakurai ............... G06F 3/04815
(Continued)

FOREIGN PATENT DOCUMENTS

CN        105148520 A    12/2015
CN        105597325 A     5/2016
(Continued)

OTHER PUBLICATIONS

Chinese Office Action dated Feb. 20, 2021 in Chinese Application No. 201910143280.4, with English translation. citing documents AO-AS therein. 7 pgs.

(Continued)

*Primary Examiner* — Chase E Leichliter
(74) *Attorney, Agent, or Firm* — ARENTFOX SCHIFF LLP

(57) ABSTRACT

A virtual scene display method, includes obtaining, an adsorption region of a target virtual object in response to detection of a viewing-angle adjustment operation. The method further includes obtaining, in response to a determination that an aiming point is located in the adsorption region of the target virtual object, a target rotation speed of a viewing angle of a virtual scene according to a location of the aiming point, a location of the target virtual object, and the viewing-angle adjustment operation. Further, the method (Continued)

includes displaying, with the circuitry of the electronic device, a target virtual scene based on the target rotation speed of the viewing angle.

20 Claims, 10 Drawing Sheets

(51) Int. Cl.
*A63F 13/24* (2014.01)
*A63F 13/426* (2014.01)
*A63F 13/52* (2014.01)
*G06T 15/20* (2011.01)

(52) U.S. Cl.
CPC ............ *A63F 13/426* (2014.09); *A63F 13/52* (2014.09); *G06T 15/20* (2013.01)

(56) References Cited

U.S. PATENT DOCUMENTS

| | | | |
|---|---|---|---|
| 9,770,664 B2* | 9/2017 | Jo | A63F 13/30 |
| 10,589,180 B2* | 3/2020 | Jo | A63F 13/30 |
| 2001/0029203 A1* | 10/2001 | Shoji | A63F 13/53 |
| | | | 463/31 |
| 2002/0107069 A1* | 8/2002 | Ishino | A63F 13/219 |
| | | | 463/52 |
| 2007/0270215 A1* | 11/2007 | Miyamoto | A63F 13/525 |
| | | | 463/32 |
| 2009/0325660 A1* | 12/2009 | Langridge | A63F 13/42 |
| | | | 463/2 |
| 2012/0001944 A1* | 1/2012 | Sakurai | G06F 3/04815 |
| | | | 345/671 |
| 2012/0007882 A1* | 1/2012 | Sakurai | G06F 3/04883 |
| | | | 345/619 |
| 2014/0243058 A1* | 8/2014 | Tsuchiya | A63F 13/426 |
| | | | 463/2 |
| 2015/0031421 A1* | 1/2015 | Jo | A63F 13/837 |
| | | | 463/2 |
| 2015/0157940 A1* | 6/2015 | Hall | A63F 13/5372 |
| | | | 463/31 |
| 2015/0231509 A1* | 8/2015 | McMain, II | A63F 13/837 |
| | | | 463/31 |
| 2015/0258439 A1* | 9/2015 | Prosin | A63F 13/00 |
| | | | 463/31 |
| 2015/0375110 A1* | 12/2015 | Volkov | A63F 13/30 |
| | | | 463/2 |
| 2016/0158641 A1* | 6/2016 | Summons | A63F 13/837 |
| | | | 463/31 |
| 2018/0221773 A1* | 8/2018 | Ye | A63F 13/837 |
| 2019/0060767 A1* | 2/2019 | Shao | A63F 13/426 |
| 2019/0118089 A1* | 4/2019 | Ying | A63F 13/2145 |
| 2021/0245062 A1* | 8/2021 | Wu | A63F 13/5258 |

FOREIGN PATENT DOCUMENTS

| | | |
|---|---|---|
| CN | 108211342 A | 6/2018 |
| CN | 108310764 A | 7/2018 |
| CN | 108415639 A | 8/2018 |
| CN | 109224439 A | 1/2019 |
| CN | 109847336 A | 6/2019 |
| JP | 2006122123 A | 5/2006 |

OTHER PUBLICATIONS

Japanese Office Action in 2021-517776, dated Apr. 28, 2022, 6 pages with English Translation.

Ono Koji, Technology that makes 3D games interesting, the first edition, SB Creative Company, Jan. 5, 2014, p. 159-160.

International Search Report dated Apr. 15, 2020 in International Application No. PC/CN2020/072853, citing documents. AA, AO-AQ therein, 11 pgs.

Japanese Office Action in 2021-517776, dated Dec. 5, 2022, 8 pages with English Translation.

Wilderness, "'Wilderness Action' You there! Is aim assist still on?" a fair hobto room, https://arajpn.com/kouya_eimuasisuto/, Jan. 8, 2019, with English Translation, pp. 1-12.

* cited by examiner

VIRTUAL SCENE DISPLAY METHOD, ELECTRONIC DEVICE, AND STORAGE MEDIUM

RELATED APPLICATIONS

This application is a continuation of International Application No. PCT/CN2020/072853, filed on Jan. 17, 2020, which claims priority to Chinese Patent Application No. 201910143280.4, filed on Feb. 26, 2019, and entitled "VIRTUAL SCENE DISPLAY METHOD AND APPARATUS, ELECTRONIC DEVICE, AND STORAGE MEDIUM". The entire disclosures of the prior applications are hereby incorporated herein by reference in their entirety.

FIELD OF THE TECHNOLOGY

This application relates to the field of computer technologies, including a virtual scene display method, an electronic device, and a storage medium.

BACKGROUND OF THE APPLICATION

With the development of computer technologies and the diversity of terminal functions, more and more types of games can be played on a terminal. A shooting game is a type of popular game. In this type of game, an aiming point is usually displayed at a terminal screen center, and a user may adjust a viewing angle of a virtual scene to adjust a region aimed at by the aiming point.

In related virtual scene display methods, usually, when a target virtual object is detected, a preset range around the target virtual object is directly used as an adsorption region. When an aiming point is located in the adsorption region, the aiming point is directly moved to the body of the target virtual object.

The foregoing virtual scene display method does not consider the user's operation intention, and directly moves the aiming point to the body of the target virtual object, which has a relatively large intensity of assisting aiming. If the user does not want to aim at the target virtual object or wants to move the aiming point to a direction away from the target virtual object, an excessive drag in the foregoing method make it difficult for the user to move the aiming point to a direction away from the target virtual object. Therefore, the virtual scene display is separated from users' operation, does not meet the user's needs, and has a poor display effect.

SUMMARY

Embodiments of this application provide a virtual scene display method, an electronic device, and a storage medium are provided.

According to an embodiment, a virtual scene display method, includes obtaining an adsorption region of a target virtual object in response to detection of a viewing-angle adjustment operation. The method further includes obtaining, with circuitry of an electronic device, in response to a determination that an aiming point is located in the adsorption region of the target virtual object, a target rotation speed of a viewing angle of a virtual scene according to a location of the aiming point, a location of the target virtual object, and the viewing-angle adjustment operation. Further, the method includes displaying a target virtual scene based on the target rotation speed of the viewing angle.

According to an embodiment, a virtual scene display method, includes obtaining, with circuitry of an electronic device, a target region corresponding to an aiming point in response to a determination that a virtual scene has switched from a first display mode to a second display mode. The second display mode is a display mode based on an aiming tool and the first display mode is another display mode other than the second display mode. The method also includes obtaining in response to a determination that the target region comprises a target virtual object, a target rotation direction and a target rotation angle of a viewing angle of the virtual scene according to a location of the target virtual object and a location of the aiming point. Further, the method includes displaying a target virtual scene based on the target rotation direction and the target rotation angle of the viewing angle. The aiming point in the target virtual scene is located in a region in which the target virtual object is located.

According to an embodiment, an electronic device includes one or more processors and one or more memories, the one or more memories storing instructions that are loaded and executed by the one or more processors. The instructions cause the processors to perform obtaining an adsorption region of a target virtual object in response to detection of a viewing-angle adjustment operation. The instructions also cause the processors to perform obtaining, in response to a determination that an aiming point is located in the adsorption region of the target virtual object, a target rotation speed of a viewing angle of a virtual scene according to a location of the aiming point, a location of the target virtual object, and the viewing-angle adjustment operation. Further, the instructions cause the processors to perform displaying a target virtual scene based on the target rotation speed of the viewing angle.

BRIEF DESCRIPTION OF THE DRAWINGS

To describe the technical solutions in embodiments of this application more clearly, the following briefly describes the accompanying drawings describing the embodiments. The accompanying drawings in the following descriptions show only some embodiments of this application.

DETAILED DESCRIPTION

Figure 1:
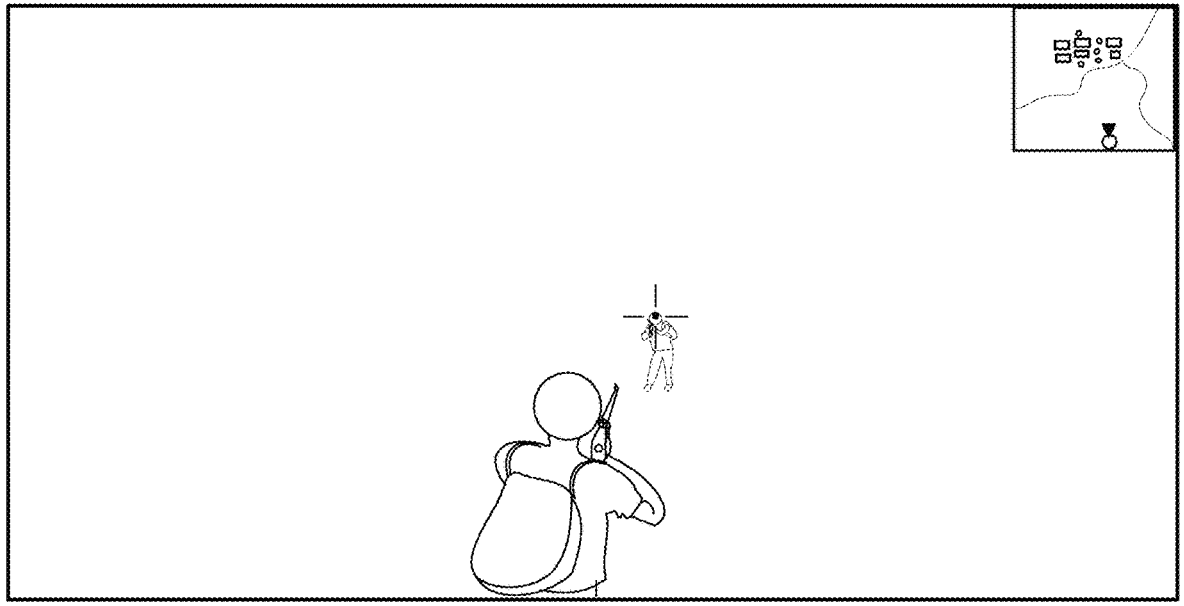
FIG. 1 is a schematic diagram of a terminal interface in which a virtual scene is not in a display mode based on an aiming tool according to an embodiment of this application.

To make objectives, technical solutions, and advantages of this application clearer, the following further describes exemplary embodiments of this application in detail with reference to the accompanying drawings.

Embodiments of this application relate to an electronic game scene or a simulation training scene. Using the electronic game scene as an example, a user may perform an operation on a terminal in advance, and a game configuration file of the electronic game may be downloaded after the terminal detects the operation of the user. The game configuration file may include an application, interface display data, virtual scene data, or the like of the electronic game, so that the user may call the game configuration file when logging in to the electronic game on the terminal, so as to render and display an electronic game interface. The user may perform a touch operation on the terminal. After the detecting the touch operation, the terminal may obtain game data corresponding to the touch operation, and render and display the game data, where the game data may include virtual scene data, behavior data of virtual objects in the virtual scene, and the like.

The virtual scene described in this application may be used for simulating a three-dimensional virtual space or a two-dimensional virtual space. The virtual scene may be used for simulating a real environment. For example, the virtual scene may include the sky, land, and ocean, and the land may include environment elements such as a desert and cities. The user may control a virtual object to move in the virtual scene. The virtual object may be a virtual figure for representing the user. The virtual figure may be in any form, for example, a human being, or an animal, which is not limited in this application.

The virtual scene may further include other virtual objects, that is, the virtual scene may include a plurality of virtual objects, and each virtual object has a shape and a volume in the virtual scene, and occupies some space in the virtual scene. For example, in a shooting game, a user may control a virtual object to fall freely, glide, parachute, or the like in the sky of the virtual scene, or run, jump, crawl, walk in a stooped posture, or the like on land, or may control a virtual object to swim, float, dive, or the like in the ocean. In an embodiment, the user may alternatively control a virtual object to ride a vehicle to move in the virtual scene. Herein, the scenes are merely used as examples, and no specific limitations are set in this embodiment of this application. The user may alternatively control the virtual object to fight against another virtual object by using a virtual prop, and the virtual prop may be a cold weapon, or may be a hot weapon. This is not specifically limited in this embodiment of this application.

A terminal screen may display a viewing angle image of a virtual object, such as a weapon, currently controlled by the terminal, and the terminal screen may also display an aiming point of the virtual object currently controlled by the terminal. The aiming point may be used for marking an aimed target in the viewing angle image of the virtual object currently controlled by the terminal, and a location of the aiming point in the virtual scene may be used as an attack impact point of the virtual object currently controlled by the terminal.

Specifically, the aiming point may be displayed at a center location of the terminal screen. In an embodiment, the aiming point may alternatively be displayed at other locations, which is not specifically limited in this embodiment of this application. The aiming point may have a plurality of display styles, and the aiming point may be displayed in a default display style of the system, or may be adjusted according to settings of the user. When seeing an aiming point displayed on the terminal, the user may determine whether a location of a virtual scene corresponding to the current aiming point is an area the user wants to aim at, and if not, the user may adjust a viewing angle of the virtual scene through a viewing-angle adjustment operation, so as to adjust the area aimed at by the aiming point. In an embodiment, the user usually wants to adjust the aiming point on the body of another virtual object in the virtual scene quickly and accurately, so as to perform shooting, slapping, or boxing on the another virtual object.

For the viewing-angle adjustment operation, the viewing-angle adjustment operation may include a plurality of types of operations. For example, the viewing-angle adjustment operation may be an operation of changing a location of a virtual object, that is, controlling the virtual object, such as a weapon, to move, so as to change the viewing angle. For example, a user directly performs the viewing-angle adjustment operation to change the viewing angle. This is not limited in this embodiment of this application.

The viewing-angle adjustment operation may alternatively include a plurality of operation manners. In a possible implementation, the viewing-angle adjustment operation may be a sliding operation. When detecting the sliding operation, the terminal may obtain a rotation direction, a rotation angle, and a rotation speed of a viewing angle corresponding to the sliding operation based on a sliding direction, a sliding distance, and a sliding speed of the sliding operation. For example, the sliding direction of the sliding operation may correspond to the rotation direction of the viewing angle, and the sliding distance of the sliding operation may be in a positive correlation with the rotation angle of the viewing angle. In an embodiment, the sliding speed of the sliding operation may be also in a positive correlation with the rotation speed of the viewing angle.

In another possible implementation, the viewing-angle adjustment operation may also be a pressing operation. Specifically, the terminal may be preset with a viewing-angle adjustment region, and the user may perform the pressing operation in the viewing-angle adjustment region. When detecting the pressing operation in the viewing-angle adjustment region, the terminal may obtain a rotation direction, a rotation speed, and a rotation angle of a viewing angle corresponding to the pressing operation based on a specific location of the pressing operation relative to the viewing-angle adjustment region, and a pressing strength and a pressing time of the pressing operation. For example, a direction of the pressing operation relative to a center of the viewing-angle adjustment region may correspond to the rotation direction of the viewing angle, the pressing strength of the pressing operation may be in a positive correlation with the rotation speed of the viewing angle, and the pressing time of the pressing operation may be in a positive correlation with the rotation angle of the viewing angle.

In still another possible implementation, the viewing-angle adjustment operation may further be a rotation operation on the terminal. When the rotation operation is detected, an angular velocity sensor (for example, a gyroscope) in the terminal may obtain a rotation direction, a rotation angle, and a rotation speed of a viewing angle according to a rotation direction, a rotation angle, and a rotation speed of the rotation operation. For example, the rotation direction of the rotation operation may be the rotation direction of the viewing angle, the rotation angle of the rotation operation may be in a positive correlation with the rotation angle of the viewing angle, and the rotation speed of the rotation operation may be in a positive correlation with the rotation speed of the viewing angle. In an embodiment, the viewing-angle adjustment operation may further be a push-button operation, a drag and drop operation on a virtual joystick region, or a toggle operation on a real joystick device, which is not specifically limited in this embodiment of this application.

In an embodiment, when the user controls the virtual object, different control effects may be further implemented through a combination of the foregoing viewing-angle adjustment operations. For example, the viewing-angle adjustment operation performed on the viewing angle by the user is the sliding operation, and during the sliding operation, the terminal detects a pressing strength of the operation in the sliding operation process, so as to determine whether to shoot based on whether the pressing strength is greater than a preset pressing strength. The foregoing is merely an exemplary description, and how to combine the foregoing viewing-angle adjustment operations and which control effects may be implemented during a specific implementation are not specifically limited in this embodiment of this application.

In the foregoing electronic game scenes, a virtual object may generally control a virtual prop to fight against another virtual object. Some gun props are further equipped with aiming tools, so as to observe a virtual scene based on the aiming tools. The aiming tool may be a mechanical aiming tool, and the mechanical aiming tool is an observation device originally equipped on the gun prop. The aiming tool may alternatively be an aiming tool equipped on the gun prop subsequently, for example, a sight. The sight may be provided with a magnification, and the magnification may be 1, or may be a value greater than 1. For example, the sight may be a red dot sight, a holographic sight, a 2X sight, a 4X sight, an 8X sight, or the like, where magnifications of the red dot sight and the holographic sight are both 1, and magnifications of the 2X sight, the 4X sight, and the 8X sight are all greater than 1. In an embodiment, the magnification of the sight may alternatively be another value. For example, the sight may alternatively be a 3X sight, a 6X sight, or a 15X sight, and the magnification of the sight is not specifically limited in this embodiment of this application.

Figure 2:
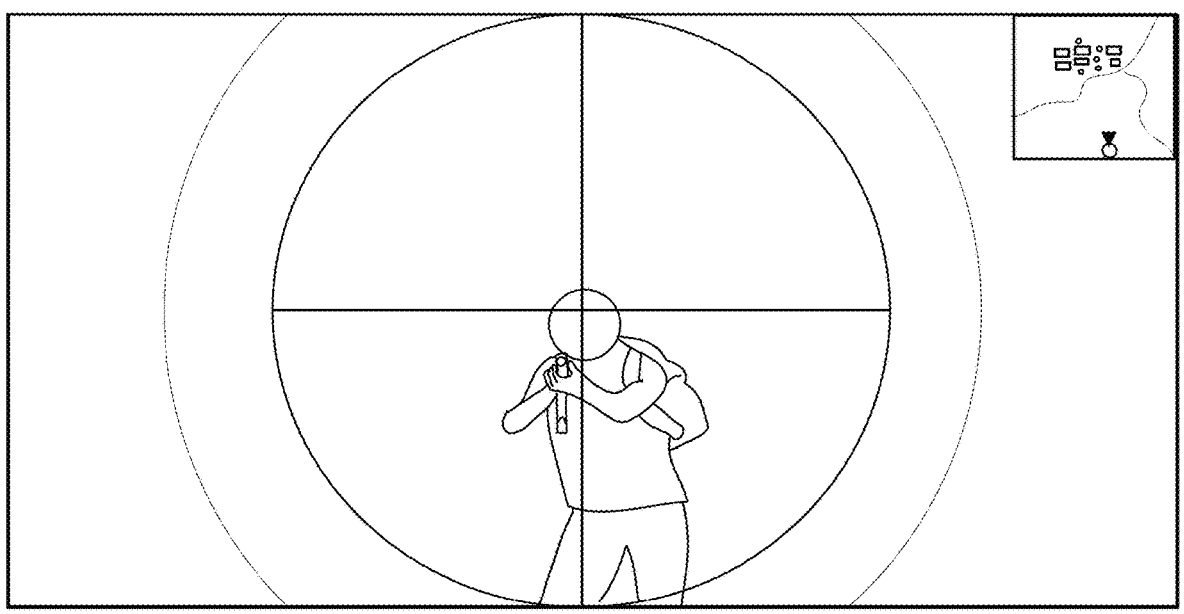
FIG. 2 is a schematic diagram of a terminal interface in which a virtual scene is in a display mode based on an aiming tool according to an embodiment of this application.

The aiming tool is configured to assist a virtual object to aim and shoot, and therefore, when controlling a virtual prop to aim or shoot, the virtual object may switch a display mode of a virtual scene to a display mode based on an aiming tool, thereby facilitating aiming and shooting an enemy virtual object more accurately. For example, as shown in FIG. 1, the virtual scene is not in the display mode based on an aiming tool. As shown in FIG. 2, a user wants to control a virtual object to accurately shoot another virtual object that appears in a virtual scene, and switches a display mode of the virtual scene to the display mode based on an aiming tool, then the virtual scene may be observed through an aiming tool on a virtual prop controlled by the virtual object.

Figure 3:
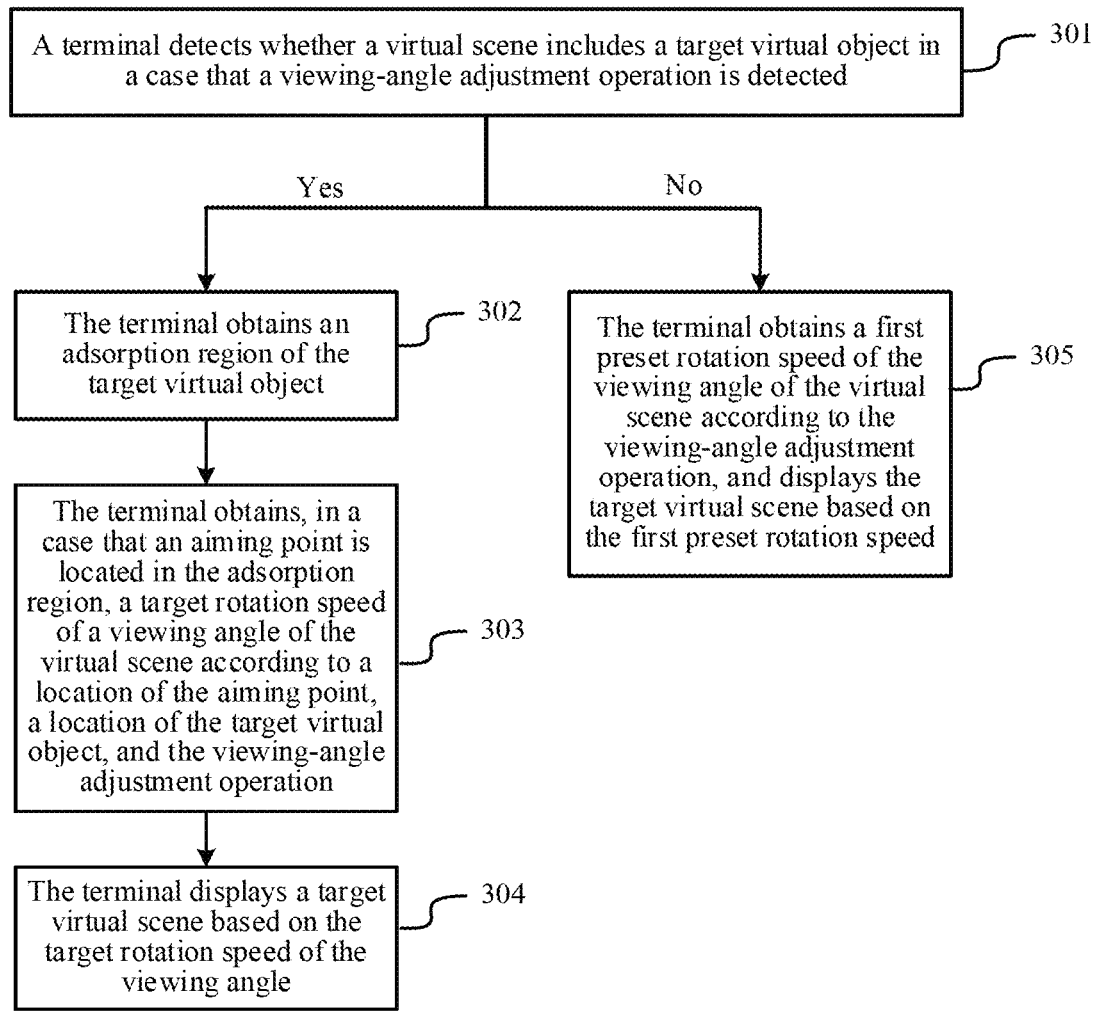
FIG. 3 is a flowchart of a virtual scene display method according to an embodiment of this application.

FIG. 3 is a flowchart of a virtual scene display method according to an embodiment of this application. Referring to FIG. 3, the method may include the following operations.

In step 301, a terminal detects whether a virtual scene includes a target virtual object in a case that a viewing-angle adjustment operation is detected, and performs step 302 in a case that the virtual scene includes the target virtual object. The terminal performs step 305 in a case that the virtual scene does not include the target virtual object.

A user may perform the viewing-angle adjustment operation on the terminal to adjust a viewing angle of a virtual scene, so as to change a location corresponding to the aiming point in the virtual scene. In this case, an aiming location and an attack impact point of a virtual object are currently controlled by the terminal through the viewing-angle adjustment operation. The foregoing content has described an operation manner and type of the viewing-angle adjustment operation, and this embodiment of this application does not repeat or limit the operation manner and type of the viewing-angle adjustment operation.

In this embodiment of this application, when the user performs the foregoing viewing-angle adjustment operation, an assisting aiming service may be provided, to assist the user to rapidly move an aiming point to the body of a virtual object that the user wants to aim at, and therefore, the operation difficulty of the user is reduced. Therefore, the terminal may detect whether the virtual scene includes the target virtual object in a case that the viewing-angle adjustment operation is detected, so as to preliminarily determine whether an assisting aiming service is required to be provided.

It may be understood that, if a virtual scene does not include a target virtual object, that is, if there is no another virtual object in a field of view of a virtual object currently controlled by the terminal, the virtual object has no target at which to aim or shoot. The viewing-angle adjustment operation may be an operation in which the user adjusts a viewing angle and does not aim, and therefore, the assisting aiming service is not required to be provided. In this case, the following step 305 of directly adjusting a viewing angle based on a viewing-angle adjustment operation may be performed. If the virtual scene includes the target virtual object, that is, there is another virtual object in a field of view of a virtual object currently controlled by the terminal, the virtual object may or may not want to aim at the other virtual object. In this case, whether the assisting aiming service is required needs to be further determined, and the following step 302 may be performed for this determination.

In a possible implementation, the target virtual object may be any virtual object other than the virtual object currently controlled by the terminal. In another possible implementation, the virtual object currently controlled by the terminal may also team up with other virtual objects. Generally, as a virtual object on a team, the virtual object currently controlled by the terminal does not need to aim at or shoot the other virtual objects on the same team. Therefore, the target virtual object may alternatively be any virtual object that is on a team different from the team to which the virtual object currently controlled by the terminal belongs. A specific determining manner of the target virtual object is not limited in this embodiment of this application.

In step 302, the terminal obtains an adsorption region of a target virtual object.

After it is determined that there is a target virtual object in the field of view of the virtual object currently controlled by the terminal, the terminal may further determine whether the target virtual object has an assisting aiming condition. When determining whether to provide an assisting aiming service, a distance between an aiming point and a target virtual object may be considered. If the aiming point is relatively close to the target virtual object, the assisting aiming service may be provided for the viewing-angle adjustment operation. If the aiming point is relatively far away from the target virtual object, the assisting aiming service may not be required to be provided. Therefore, the fairness of electronic games may be ensured while providing an assisting aiming service to reduce the complexity of users' operation.

Specifically, an adsorption region may be set for a target virtual object, and the adsorption region is a location of an aiming point that may provide an assisting aiming service when aiming at a target virtual object. That is, when the aiming point is located in the adsorption region, the user may be assisted to adjust a viewing angle, to move a location of the aiming point to the body of the target virtual object, so as to implement a rapid aiming. The adsorption region may be a region around or near the target virtual object.

In a possible implementation, the adsorption region may be a region using the target virtual object as a center and using a target size as a size. The target size may be preset. In a possible implementation, the target size may alternatively be obtained based on a distance between a virtual object currently controlled by the terminal and a target virtual object. Correspondingly, step 302 may include the terminal obtaining an adsorption region of the target virtual object according to a distance between the virtual object currently controlled by the terminal and the target virtual object, a size of the adsorption region being in a positive correlation with the distance. A larger distance indicates a larger size of the adsorption region. A smaller distance indicates a smaller size of the adsorption region. In this way, when a distance between a first virtual object and a second virtual object is large, a display size of the first virtual object is small, and a display size of an adsorption region of the first virtual object may not be excessively small, so that the user may adjust the viewing angle through a control operation easily. This allows a location of the aiming point to move to the adsorption region of the target virtual object, thereby assisting aiming.

Figure 4:
FIG. 4 is a schematic diagram of a distance relationship between a size of an adsorption region and a virtual object according to an embodiment of this application.

For example, as shown in FIG. 4, a size of an adsorption region of a target virtual object with a relatively large distance is relatively large within the virtual space, and the display size of the adsorption region is relatively small because the distance is relatively large. A size of an adsorption region of a target virtual object with a relatively small distance is relatively small within the virtual space, and the display size of the adsorption region is relatively large because the distance is relatively small. It may be seen that, an edge of an adsorption region of a target virtual object with a relatively large distance is relatively far away from the target virtual object, and an edge of an adsorption region of a target virtual object with a relatively small distance is relatively close to the target virtual object. Therefore, relative sizes of adsorption regions within the virtual space of the two target virtual objects are actually the opposite to how the adsorption regions are displayed.

In a possible implementation, a shape of the adsorption region may also be preset. For example, the adsorption region may be a circular region using the target virtual object as a center; or may be a polygonal region using the target virtual object as a center, for example, a quadrangular region. In an embodiment, the adsorption region may alternatively be a spherical region using the target virtual object as a center; or may be a cylindrical region or a polygonal region using the target virtual object as a center. The shape of the adsorption region is not limited in this embodiment of this application.

In step 303, the terminal obtains, in a case that an aiming point is located in the adsorption region of the target virtual object, a target rotation speed of a viewing angle of a virtual scene according to a location of the aiming point, a location of the target virtual object, and the viewing-angle adjustment operation. In an embodiment of step 303, the terminal may obtain the target rotation speed of the viewing angle of the virtual scene in response to a determination that the aiming point is located in the adsorption region of the target virtual object.

After obtaining the adsorption region of the target virtual object, the terminal may determine a location relationship between the aiming point and the adsorption region, so as to determine whether an assisting aiming service is required to be provided according to the location relationship. Specifically, the terminal may determine whether the aiming point is located in the adsorption region of the target virtual object. If the aiming point is located in the adsorption region, the terminal may perform step 303, to provide an assisting aiming service. If the aiming point is not located in the adsorption region, the terminal may perform the following step 305, to directly adjust a viewing angle based on the viewing-angle adjustment operation.

The terminal may obtain a target rotation speed of a viewing angle of a virtual scene by considering a location of the aiming point, a location of the target virtual object, and the viewing-angle adjustment operation. Specifically, the terminal may obtain the target rotation speed of the viewing angle of the virtual scene based on a first rotation speed corresponding to the viewing-angle adjustment operation, and a second rotation speed corresponding to the locations of the aiming point and the target virtual object.

In a possible implementation, the process in which the terminal obtains the target rotation speed in step 303 may be implemented through the following steps 1 through 3.

In step 1, the terminal obtains a first rotation speed of the viewing angle of the virtual scene according to the viewing-angle adjustment operation.

In step 1, the terminal may obtain the first rotation speed corresponding to the viewing-angle adjustment operation. When operation manners of the viewing-angle adjustment operation or types of the viewing-angle adjustment operation are different, the terminal may obtain the first rotation speed in different manners.

For example, if the viewing-angle adjustment operation is a sliding operation or a drag and drop operation, the terminal may obtain the first rotation speed of the viewing angle of the virtual scene according to an operation direction and an operation distance of the viewing-angle adjustment operation. If the viewing-angle adjustment operation is a pressing operation, the terminal may obtain the first rotation speed of the viewing angle of the virtual scene according to a pressing location and a pressing strength or a pressing time of the viewing-angle adjustment operation. If the viewing-angle adjustment operation is a rotation operation on the terminal, the terminal may obtain the first rotation speed of the viewing angle of the virtual scene according to a rotation speed of the terminal, or obtain the first rotation speed according to a rotation angle and a rotation direction of the terminal. In some embodiments, the viewing-angle adjustment operation may further be an operation of another type, and this is not limited in this embodiment of this application.

In a possible implementation, when the aiming point is located at different locations in the adsorption region, the terminal may obtain different first rotation speeds. For example, the first rotation speed may be in a positive correlation with a distance between the aiming point and a center of the adsorption region. A larger distance between the aiming point and the center of the adsorption region indicates a larger first rotation speed. A smaller distance between the aiming point and the center of the adsorption region indicates a smaller first rotation speed.

In a specific possible embodiment, the target virtual object may include a plurality of adsorption regions. Alternatively, it may be understood that the adsorption region includes a plurality of subregions. Different adsorption regions indicate different first rotation speeds corresponding to the viewing-angle adjustment operation. That is, when the aiming point is located in different adsorption regions, the terminal may obtain different first rotation speeds according to the viewing-angle adjustment operation. Specifically, the target virtual object may include a first adsorption region, a second adsorption region, and a third adsorption region. Correspondingly, the process in which the terminal obtains the first rotation speed may include the following three cases.

In case 1, the terminal obtains, in a case that the aiming point is located in the first adsorption region of the target virtual object, a first preset rotation speed of the viewing angle of the virtual scene according to the viewing-angle adjustment operation.

The first preset rotation speed is a normal rotation speed corresponding to the viewing-angle adjustment operation when the assisting aiming service is not provided. When the aiming point is located in the first adsorption region, the terminal may not adjust the rotation speed corresponding to the viewing-angle adjustment operation, and therefore, the terminal may obtain the first preset rotation speed.

In case 2, the terminal obtains, in a case that the aiming point is located in the second adsorption region of the target virtual object, a second preset rotation speed of the viewing angle of the virtual scene according to the viewing-angle adjustment operation, the second preset rotation speed being less than the first preset rotation speed.

Figure 5:
FIG. 5 is a schematic diagram of a terminal interface in which an aiming point is relatively close to a target virtual object according to an embodiment of this application.

In the case 2, the first adsorption region surrounds the second adsorption region. That is, a size of the second adsorption region is less than that of the first adsorption region, and the second adsorption region is closer to the target virtual object than is the first adsorption region. When the aiming point is located in the second adsorption region, the terminal may obtain a rotation speed less than the first preset rotation speed according to the viewing-angle adjustment operation. In this case, the rotation speed of the viewing angle may be reduced when the target virtual object is closer, and therefore, the user may be assisted to move the aiming point to the body of the target virtual object and keep the aiming point at the body of the target virtual object more easily instead of moving the aiming point to pass over the location of the target virtual object. For example, as shown in FIG. 5, the aiming point is quite close to the target virtual object, and the rotation speed of the viewing angle needs to be reduced to facilitate keeping the aiming point at the body of the target virtual object more easily.

In a possible implementation, different sensitivities may be set for the viewing-angle adjustment operation. The sensitivity may be a proportion of a movement distance of a controlled virtual object to an operation amplitude or an operation distance of the user. The sensitivity may alternatively be a proportion of a rotation speed of a viewing angle to an operation amplitude or an operation distance of the user, and the sensitivity is in a positive correlation with a preset rotation speed corresponding to the viewing-angle adjustment operation. That is, a larger sensitivity indicates a greater preset rotation speed corresponding to a viewing-angle adjustment operation of the user, and vice versa. In the foregoing case 1 and case 2, when the aiming point is located in different adsorption regions, the sensitivities corresponding to the viewing-angle adjustment operation may be different, and therefore, preset rotation speeds obtained by the terminal based on the viewing-angle adjustment operation may be different.

For example, when the aiming point is located in the first adsorption region, the viewing-angle adjustment operation corresponds to a first sensitivity. When the aiming point is located in the second adsorption region, the viewing-angle adjustment operation corresponds to a second sensitivity. The second sensitivity is less than the first sensitivity. The first sensitivity and the second sensitivity may be preset, or may be adjusted by the user according to preferences of the user, which is not limited in this embodiment of this application. In a specific possible embodiment, the second sensitivity may be obtained based on the first sensitivity, for example, to obtain a product of the first sensitivity and a target coefficient, and in another example, to obtain a difference between the first sensitivity and a target value. This is not limited in this embodiment of this application.

In another possible implementation, the second preset rotation speed may be obtained based on the first preset rotation speed. For example, the terminal may obtain a difference between the first preset rotation speed and a first value, and use the difference as the second preset rotation speed. The first value is a positive number. Alternatively, the terminal may obtain a product of the first preset rotation speed and a first coefficient, and use the product as the second preset rotation speed. The first coefficient is a positive number less than 1.

The foregoing only provides two possible implementations, and in an embodiment, in the case 2, the terminal may alternatively obtain the second preset rotation speed in other manners. For example, a plurality of value sets may be set for the viewing-angle adjustment operation, and each value set includes a plurality of different values. When the aiming point is located in different adsorption regions, the value sets corresponding to the viewing-angle adjustment operation are different. A specific implementation is not limited in this embodiment of this application.

In case 3, the terminal obtains, in a case that the aiming point is located in a third adsorption region of the target virtual object, a third preset rotation speed of the viewing angle of the virtual scene according to the viewing-angle adjustment operation, the third preset rotation speed being less than the first preset rotation speed, and the third preset rotation speed being different from the second preset rotation speed.

The case 3 is similar to the foregoing case 2, and the process in which the terminal obtains the third preset rotation speed is similar to the process of obtaining the second preset rotation speed in the foregoing case 2. The difference is that, the third preset rotation speed obtained by the terminal in the case 3 is different from the second preset rotation speed. That is, the second sensitivity corresponding to the viewing-angle adjustment operation when the aiming point is located in the second adsorption region is different from a third sensitivity corresponding to the viewing-angle adjustment operation when the aiming point is located in the third adsorption region. The third sensitivity is less than the first sensitivity. For example, a damping coefficient is added on the basis of the original sensitivity, and the damping coefficient is a coefficient that reduces the sensitivity. In this case, the sensitivity corresponding to the viewing-angle adjustment operation is reduced, and correspondingly, the preset rotation speed corresponding to the viewing-angle adjustment operation is also reduced. It is not easy for the user to move the aiming point out of the third adsorption region. Specific values of the sensitivity and the damping coefficient are not limited in this embodiment of this application. Through the foregoing changes of the sensitivity, the user may adjust a region aimed at by the aiming point more precisely through the foregoing viewing-angle adjustment operation. That is, the user may finely adjust the viewing angle by adjusting the control operation greatly, so as, for example, to adjust the body part of the aimed target virtual object, and also to prevent the user from causing the aiming point to move away from the target virtual object too fast due to an excessively large operation amplitude.

The second adsorption region surrounds the third adsorption region. That is, a size of the third adsorption region is less than a size of the second adsorption region. In a possible implementation, the third sensitivity may be less than the second sensitivity, that is, the third preset rotation speed is less than the second preset rotation speed. In this case, a closer distance between the aiming point and the target virtual object indicates a smaller sensitivity corresponding to the viewing-angle adjustment operation and a smaller preset rotation speed corresponding to the viewing-angle adjustment operation. In a specific possible embodiment, the third adsorption region may be a region in which the target virtual object is located. In this case, through a setting that the third preset rotation speed is less than the second preset rotation speed, a case that the aiming point is moved away from the target virtual object due to an excessively large operation amplitude of the user is avoided to some extent. In an embodiment, the third sensitivity may alternatively be greater than the second sensitivity, that is, the third preset rotation speed may be greater than the second preset rotation speed. The foregoing settings may all be preset according to requirements, and this is not limited in this embodiment of this application.

Further, the third sensitivity may alternatively be obtained based on the second sensitivity. The obtaining process is similar to the process of obtaining the second sensitivity based on the first sensitivity, and this is not repeated in this embodiment of this application.

In another possible implementation, the third preset rotation speed may alternatively be obtained based on the first preset rotation speed. For example, the terminal may obtain a difference between the first preset rotation speed and a second value, and use the difference as the third preset rotation speed. The second value is a positive number. Alternatively, the terminal may obtain a product of the first preset rotation speed and a second coefficient, and use the product as the third preset rotation speed. The second coefficient is a positive number less than 1.

In still another implementation, the third preset rotation speed may alternatively be obtained based on the second preset rotation speed, and a manner is similar to the foregoing implementation. This is not repeated in this embodiment of this application.

Figure 6:
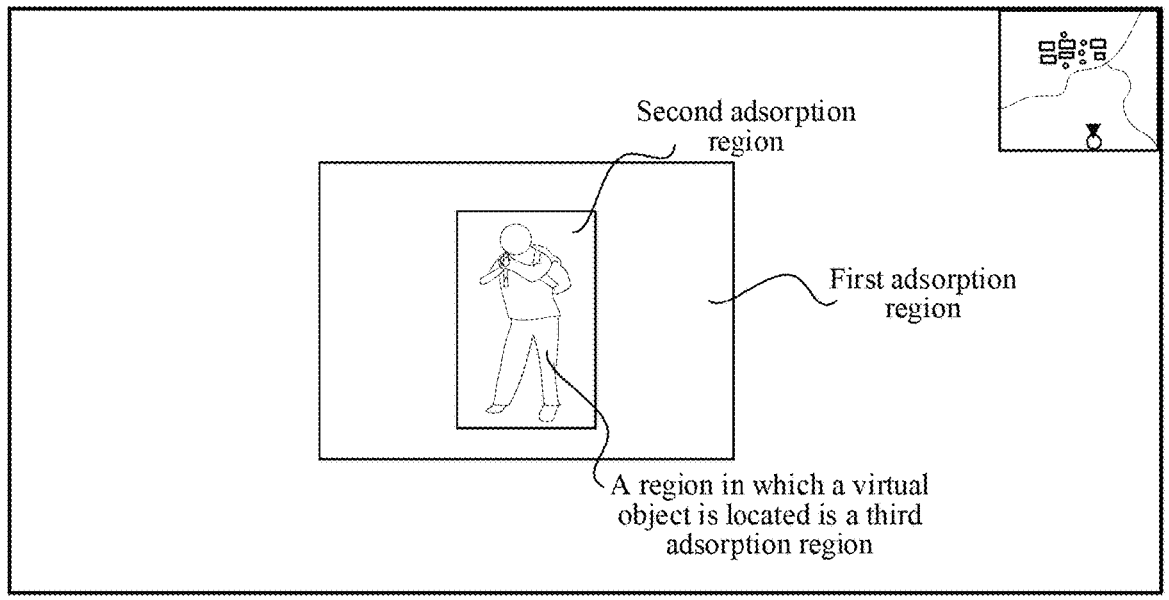
FIG. 6 is a schematic diagram of three types of adsorption regions according to an embodiment of this application.

For example, as shown in FIG. 6, the target virtual object includes three adsorption regions. The three adsorption regions are only used as an exemplary description. Shapes and sizes of the three adsorption regions are not limited in this embodiment of this application.

An example in which the target virtual object includes three adsorption regions are used for description only, and the target virtual object may alternatively include more adsorption regions or may alternatively include adsorption regions less than three. All of the settings of the adsorption region of the target virtual object may be adjusted according to requirements, and this is not limited in this embodiment of this application.

In a specific possible embodiment, in the foregoing operation of determining whether the aiming point is located in the adsorption region corresponding to the target virtual object, the terminal may set an impactor for each virtual object, and the impactor is configured to detect an adsorption region of the virtual object. The terminal may perform a radiographic detection based on a direction of the aiming point, and if the ray collides through the impactor of the virtual object, an adsorption region of the aiming point in the virtual object may be obtained. In an embodiment, a manner of the impactor and the radiographic detection is only used as a possible implementation, and the terminal may alternatively determine according to location coordinates of the aiming point and a coordinates range of the adsorption region. A specific manner is not limited in this embodiment of this application.

In step 2, the terminal obtains a second rotation speed of the viewing angle of the virtual scene according to the location of the aiming point and the location of the target virtual object, a direction of the second rotation speed being from the aiming point toward the target virtual object.

In addition to the viewing-angle adjustment operation, the terminal may alternatively determine how to assist based on the rotation speed of the viewing angle corresponding to a user's operation by considering a location relationship between the aiming point and the target virtual object. Specifically, the terminal may obtain a distance between the aiming point and the target virtual object according to the location of the aiming point and the location of the target virtual object. The distance between the aiming point and the target virtual object may be represented in a plurality of manners, and step 2 is described below in three different representation manners of the distance.

In manner 1, the terminal obtains the second rotation speed of the viewing angle of the virtual scene according to a distance between projections of the target virtual object and the aiming point on a terminal screen.

In the manner 1, the distance between the aiming point and the target virtual object may be represented by the distance between the projections of the aiming point and the target virtual object on the terminal screen. The distance is in a conversion relationship with the second rotation speed, and the terminal may calculate the second rotation speed according to the distance and the conversion relationship.

In a possible implementation, the second rotation speed is in a negative correlation with the distance between the projections of the target virtual object and the aiming point on the terminal screen. That is, a smaller distance indicates a greater second rotation speed; and a greater distance indicates a smaller second rotation speed. In this case, in a process in which the aiming point approaches the target virtual object, a strength of assisting aiming may be improved continuously, the user may be assisted to quickly aim at the target virtual object. The user's operation is fully respected, and the assisting aiming is performed based on the user's operation.

In a possible implementation, the second rotation speed may further be in a positive correlation with the distance between the projections of the target virtual object and the aiming point on the terminal screen. This is not limited in this embodiment of this application.

In manner 2, the terminal obtains the second rotation speed of the viewing angle of the virtual scene according to a distance between the target virtual object and the aiming point in the virtual scene.

In the manner 2, the distance between the aiming point and the target virtual object may be represented by the distance between the aiming point and the target virtual object in the virtual scene. The distance is in a conversion relationship with the second rotation speed, and the terminal may calculate the second rotation speed according to the distance and the conversion relationship.

In a possible implementation, the second rotation speed is in a negative correlation with the distance between the target virtual object and the aiming point in the virtual scene. That is, a smaller distance indicates a greater second rotation speed; and a greater distance indicates a smaller second rotation speed. In this case, in a process in which the aiming point approaches the target virtual object, the amount of aiming assistance may be improved continuously, so the user may be assisted to quickly aim at the target virtual object.

In a possible implementation, the second rotation speed may alternatively be in a positive correlation with the distance between the target virtual object and the aiming point in the virtual scene. This is not limited in this embodiment of this application.

In manner 3, the terminal obtains the second rotation speed of the viewing angle of the virtual scene according to an angle between a direction of a line connecting a virtual object currently controlled by the terminal to the target virtual object and a direction of the aiming point.

In the manner 3, the distance between the aiming point and the target virtual object may be represented by the angle between the direction of the line connecting the virtual object currently controlled by the terminal to the target virtual object and the direction of the aiming point. The angle is in a conversion relationship with the second rotation speed, and the terminal may calculate the second rotation speed according to the angle and the conversion relationship.

In a possible implementation, the second rotation speed is in a negative correlation with the angle. That is, a larger angle indicates a smaller second rotation speed; and a smaller distance indicates a greater second rotation speed. In this case, in a process in which the aiming point approaches the target virtual object, of the amount of aiming assistance may be improved continuously, so the user may be assisted to quickly aim at the target virtual object.

In another possible implementation, the second rotation speed may alternatively be in a positive correlation with the angle. This is not limited in this embodiment of this application.

The foregoing only provides three exemplary representation manners of the distance between the aiming point and the target virtual object, and the distance may alternatively include other representation manners. For example, other representation manners may include a horizontal distance between the projections of the aiming point and the target virtual object on the terminal screen, and the horizontal distance may be a distance component of the distance between the projections of the aiming point and the target virtual object on the terminal screen in the horizontal direction. Similarly, the distance may alternatively be a horizontal distance between the aiming point and the target virtual object in the virtual scene, and the horizontal distance may be a distance component of the distance between the aiming point and the target virtual object in the virtual scene in the horizontal direction. A specific representation manner is not limited in this embodiment of this application.

In a possible implementation, a process in which the terminal obtains the second rotation speed in step 2 may alternatively consider an operation direction of the viewing-angle adjustment operation. That is, when the operation direction of the viewing-angle adjustment operation differs, the terminal may obtain different second rotation speeds according to the location of the aiming point and the location of the target virtual object.

In this implementation, step 2 may include the terminal obtaining the second rotation speed of the viewing angle of the virtual scene according to the location of the aiming point, the location of the target virtual object, and the operation direction of the viewing-angle adjustment operation.

Specifically, the operation directions of the viewing-angle adjustment operation may be divided into two types. One type is to control the aiming point to move toward the target virtual object, and the other is to control the aiming point to move to a direction opposite to the target virtual object. The process in which the terminal obtains the second rotation speed in these two cases is described below.

In case 1, the terminal obtains, in a case that the operation direction of the viewing-angle adjustment operation indicates that the aiming point moves toward the target virtual object, a third rotation speed as the second rotation speed of the viewing angle of the virtual scene according to the location of the aiming point, the location of the target virtual object, and a first parameter.

In case 2, the terminal obtains, in a case that the operation direction of the viewing-angle adjustment operation indicates that the aiming point moves in a direction away from the target virtual object, a fourth rotation speed as the second rotation speed of the viewing angle of the virtual scene according to the location of the aiming point, the location of the target virtual object, and a second parameter, the fourth rotation speed being less than the third rotation speed.

In the foregoing two cases, the first parameter and the second parameter may be set according to requirements. The distance between the aiming point and the target virtual object and the conversion relationship between the first parameter and the third rotation speed may also be set according to requirements. The distance between the aiming point and the target virtual object and the conversion relationship between the second parameter and the fourth rotation speed may also be set according to requirements. This is not limited in this embodiment of this application. If the viewing-angle adjustment operation enables the aiming point to be close to the target virtual object, a relatively large second rotation speed may be provided, that is, the third rotation speed, and the provided assisting aiming strength is relatively large. However, if the viewing-angle adjustment operation enables the aiming point to be far away from the target virtual object, a relatively small second rotation speed may be provided, that is, the fourth rotation speed, and the provided assisting aiming strength is relatively small. Directions of the third rotation speed and the fourth rotation speed are the same, and both are directions from the aiming point toward the target virtual object, only speeds are different.

Figure 7:
FIG. 7 is a schematic diagram of a terminal interface according to an embodiment of this application.

For example, as shown in FIG. 7, the target virtual object is to the left of the aiming point, and if the viewing-angle adjustment operation indicates the aiming point to move toward the front-left direction, the aiming point would move closer to the target virtual object, and the distance between the two would become smaller. If the first rotation speed corresponding to the viewing-angle adjustment operation is 30 degrees per second, one third rotation speed may be added based on the first rotation speed. The third rotation speed may be 10 degrees per second, and directions of the third rotation speed and the first rotation speed are the same. When the viewing-angle adjustment process is embodied in a location change of the aiming point in the virtual scene displayed by an adjacent frame, it may be that: the viewing-angle adjustment operation may control the aiming point to move toward the left for 90 meters in a frame of image relative to a previous frame of image, and the third rotation speed enables the aiming point to move toward the left for 30 meters more.

If the viewing-angle adjustment operation indicates the aiming point to move toward the front-right direction, the aiming point is moving away from the target virtual object, and the distance between the two becomes larger. If the first rotation speed corresponding to the viewing-angle adjustment operation is 30 degrees per second, one fourth rotation speed may be added based on the first rotation speed. The fourth rotation speed may be 3 degrees per second. Directions of the fourth rotation speed and the first rotation speed are opposite. When the viewing-angle adjustment process is embodied in a location change of the aiming point in the virtual scene displayed by an adjacent frame, it may be that: the viewing-angle adjustment operation may control the aiming point to move toward the right for 90 meters in a frame of image relative to a previous frame of image, and the third rotation speed enables the aiming point to move toward the left for 9 meters more, that is, the aiming point moves to the right for 9 meters less. The fourth rotation speed is less than the third rotation speed, and the assisting aiming strength becomes smaller.

In a specific possible embodiment, if the terminal adopts the representation manner of the foregoing manner 1 or manner 2, and the distances between the aiming point and the target virtual object obtained in the foregoing manners are the same but the distances between the virtual objects currently controlled by the terminal and the target virtual objects obtained in the foregoing manners are different, rotation angles of the viewing angle for moving the aiming point to the body of the target virtual object are different. The terminal may alternatively obtain a distance between the virtual object currently controlled by the terminal and the target virtual object, and obtain the second rotation speed by considering the distance in the foregoing step 2. In this embodiment, the distance between the virtual object currently controlled by the terminal and the target virtual object, the distance between the aiming point and the target virtual object, and the second rotation speed may have a conversion relationship, so as to ensure to obtain different second rotation speeds when the distances between the aiming points and the target virtual objects are the same but the distances between the virtual object currently controlled by the terminal and the target virtual object are different.

For example, when the distance between the aiming point and the target virtual object is the same, if the distance between the virtual object currently controlled by the terminal and the target virtual object is relatively large, and the rotation angle for the viewing angle is relatively small, a relatively small second rotation speed is obtained; and if the distance between the virtual object currently controlled by the terminal and the target virtual object is relatively small, and a rotation angle for the viewing angle is relatively large, a relatively large second rotation speed is obtained. In this case, when the distances between the virtual objects currently controlled by the terminal and the target virtual object are different, the same assisting effect may be provided.

Correspondingly, the foregoing manner 1 may include the terminal obtaining the second rotation speed of the viewing angle of the virtual scene according to the distance between the virtual object currently controlled by the terminal and the target virtual object and the distance between the projections of the target virtual object and the aiming point on the terminal screen, the second rotation speed being in a negative correlation with the distance between the virtual object currently controlled by the terminal and the target virtual object.

The foregoing manner 2 may include the terminal obtaining the second rotation speed of the viewing angle of the virtual scene according to the distance between the virtual object currently controlled by the terminal and the target virtual object and the distance between the target virtual object and the aiming point in the virtual scene, the second rotation speed being in a negative correlation with the distance between the virtual object currently controlled by the terminal and the target virtual object.

The foregoing provides a plurality of exemplary implementations in which the terminal obtains the second rotation speed. The terminal may obtain the second rotation speed by adopting any implementation, or may obtain the second rotation speed in any combination of the foregoing plurality of implementations. For example, in a process of obtaining the second rotation speed, both the operation direction of the viewing-angle adjustment operation and the distance between the virtual object currently controlled by the terminal and the target virtual object may be considered. Therefore, the terminal may obtain the second rotation speed based on the operation direction of the viewing-angle adjustment operation, the distance between the virtual object currently controlled by the terminal and the target virtual object, the location of the aiming point, and the location of the target virtual object. This is not limited or repeated in this embodiment of this application.

The terminal may first perform step 1 and then perform step 2, or may first perform step 2 and then perform step 1. In an embodiment, step 1 and step 2 may be performed simultaneously. An execution order of step 1 and step 2 is not limited in this embodiment of this application.

In the foregoing case, the adsorption region includes three adsorption regions (or sub-regions), an implementation is further included. The terminal performs, in a case that the aiming point is located in a first adsorption region (or first adsorption sub-region) or a second adsorption region (or second adsorption sub-region) of the target virtual object, the operation of obtaining the second rotation speed of the viewing angle of the virtual scene according to the location of the aiming point and the location of the target virtual object. When the aiming point is located in the third adsorption region (or third adsorption sub-region) of the target virtual object, step 2 is not performed. Alternatively, zero is used as the second rotation speed. Correspondingly, step 3 may be that: the terminal uses the first rotation speed as the target rotation speed of the viewing angle of the virtual scene.

That is, in the first adsorption region, the first rotation speed of the viewing angle corresponding to the viewing-angle adjustment operation may be a normal rotation speed corresponding to the user's operation. However, on the basis of the first rotation speed, the second rotation speed may be obtained based on the location of the aiming point and the location of the target virtual object, so as to obtain the target rotation speed based on the first rotation speed and the second rotation speed comprehensively. In the second adsorption region, the first rotation speed of the viewing angle corresponding to the viewing-angle adjustment operation may be smaller than a rotation speed corresponding to the user's operation. On the basis of the first rotation speed, the second rotation speed may be obtained based on the location of the aiming point and the location of the target virtual object, so as to obtain the target rotation speed by using the first rotation speed and the second rotation speed. In the third adsorption region, the terminal may only perform step 1, the first rotation speed of the viewing angle corresponding to the viewing-angle adjustment operation is less than the normal rotation speed corresponding to the user's operation, and the first rotation speed is used as the target rotation speed.

In step 3, the terminal obtains the target rotation speed of the viewing angle of the virtual scene based on the first rotation speed and the second rotation speed.

After obtaining the first rotation speed and the second rotation speed, the terminal may obtain a target rotation speed of the viewing angle of the virtual scene by using the two rotation speeds, and the target rotation speed is a rotation speed for adjusting the viewing angle.

In a possible implementation, weights may be set for the first rotation speed and the second rotation speed, and the terminal may perform a weighted sum on the first rotation speed and the second rotation speed, to obtain the target rotation speed of the viewing angle of the virtual scene. The weights of the first rotation speed and the second rotation speed may be set according to requirements, or may be obtained based on the location of the aiming point and the location of the target virtual object, or may be obtained based on the distance between the virtual object currently controlled by the terminal and the target virtual object. This is not limited in this embodiment of this application.

In an embodiment, if both the weights of the first rotation speed and the second rotation speed are set to 1, step 3 includes the terminal performing a sum on the first rotation speed and the second rotation speed, to obtain the target rotation speed of the viewing angle of the virtual scene. Both the first rotation speed and the second rotation speed may be vectors, and directions of the first rotation speed and the second rotation speed may be the same or may be different. The direction of the first rotation speed is a direction corresponding to the viewing-angle adjustment operation, and the direction of the second rotation speed is a direction from the aiming point toward the target virtual object. Therefore, step 3 may include performing a vector sum on the first rotation speed and the second rotation speed, to obtain the target rotation speed.

An example of two extreme cases is used for description in the following. In case 1, the directions of the first rotation speed and the second rotation speed are the same. The aiming point is at the front-left of the target virtual object, and an operation direction of the viewing-angle adjustment operation is a front-right direction, that is, the aiming point is controlled to move along the front-right direction, and the direction of the first rotation speed is the front-right direction. The direction of the second rotation speed is a direction from the aiming point toward the target virtual object, that is, the front-right direction. A value of the target rotation speed may be a sum value of a value of the first rotation speed and a value of the second rotation speed, and a direction of the target rotation speed is the front-right direction.

In case 2, the directions of the first rotation speed and the second rotation speed are opposite. The aiming point is at the front-left of the target virtual object, and an operation direction of the viewing-angle adjustment operation is a front-left direction, that is, the aiming point is controlled to move along the front-left direction, and the direction of the first rotation speed is the front-left direction. The direction of the second rotation speed is the direction from the aiming point toward the target virtual object, that is, the front-right direction. The value of the target rotation speed may be a difference between the value of the first rotation speed and the value of the second rotation speed, and the direction of the target rotation speed depends on a size relationship between the value of the first rotation speed and the value of the second rotation speed. If the value of the first rotation speed is greater than the value of the second rotation speed, the direction of the target rotation speed is the front-left direction. If the value of the first rotation speed is less than the value of the second rotation speed, the direction of the target rotation speed is the front-right direction. If the value of the first rotation speed is equal to the value of the second rotation speed, the target rotation speed is zero. In a possible implementation, the first rotation speed may be greater than the second rotation speed. In this case, it may ensure to respect the user's operation, ensure the equity and fairness of the electronic games, and ensure a better game experience.

The foregoing step 303 is a process of providing an assisting aiming service when the aiming point is located in the adsorption region of the target virtual object. After calculating the target rotation speed of the viewing angle of the virtual scene, the terminal may perform the following step 304, to adjust the viewing angle. In another possible case, when the aiming point is located outside the adsorption region of the target virtual object, the terminal may perform step 305 of not providing an assisting aiming service but directly perform a normal viewing-angle adjustment based on the viewing-angle adjustment operation.

In step 304, the terminal displays a target virtual scene based on the target rotation speed of the viewing angle.

After obtaining the target rotation speed of the viewing angle, the terminal may adjust the viewing angle based on the target rotation speed and display an adjusted target virtual scene. A specific process in which the terminal adjusts the viewing angle of the virtual scene may be that: the terminal may calculate a rotation angle of the viewing angle of the virtual scene in a preset time interval according to the target rotation speed of the viewing angle; and the terminal controls the viewing angle to rotate for the rotation angle. The preset time interval refers to a time interval between adjacent frames, and the preset time interval may be preset, or may be set and adjusted by the user according to the running situation of the device.

Step 301 to step 304 are a dynamic viewing angle adjustment process, and the terminal may perform step 301 to step 304 at each frame. After obtaining the target rotation speed of the viewing angle through calculation at each frame, the terminal may calculate a rotation angle of the viewing angle from this frame to a next frame based on the target rotation speed of the viewing angle, to obtain a viewing angle direction of the next frame time, so as to render and display a target virtual scene at the next frame. Then the terminal repeats the foregoing detection, obtaining, and adjustment and displaying processes at the next frame.

In the foregoing step 301 to step 302, a specific procedure is provided in which an assisting aiming service may be provided when the aiming point is located in the adsorption region of the target virtual object. In a possible scenario, a field of view of the virtual object currently controlled by the terminal may further include a plurality of other virtual objects. The plurality of other virtual objects are all candidate virtual objects. That is, any one of the candidate virtual objects may be selected as a target virtual object. In this scenario, the terminal may select one from the plurality of candidate virtual objects as the target virtual object, so as to provide an assisting aiming service in a process of aiming at the target virtual object.

Specifically, when the aiming point is located in adsorption regions of a plurality of candidate virtual objects, the terminal selects a candidate virtual object from the plurality of candidate virtual objects as the target virtual object. The terminal performs step 303 based on the selected target virtual object, that is, performs the operation of obtaining the target rotation speed of the viewing angle of the virtual scene according to the location of the aiming point, the location of the target virtual object, and the viewing-angle adjustment operation.

A process in which the terminal selects the target virtual object from the plurality of candidate virtual objects may be implemented through any manner, such as the following.

In manner 1, the terminal randomly selects a candidate virtual object from the plurality of candidate virtual objects as the target virtual object.

In manner 2, the terminal selects a candidate virtual object closest to the aiming point as the target virtual object according to distances between the plurality of candidate virtual objects and the aiming point in the virtual scene.

In manner 3, the terminal selects a candidate virtual object closest to the aiming point as the target virtual object according to distances between locations of projections of the plurality of candidate virtual objects and the aiming point on a terminal screen.

In manner 4, the terminal selects, according to angles between directions of lines connecting the plurality of candidate virtual objects to a virtual object currently controlled by the terminal and a direction of the aiming point, a candidate virtual object with a minimum angle as the target virtual object.

In the manner 4, the terminal may obtain the angles, and then select a candidate virtual object with a minimum angle as the target virtual object. A process in which the terminal obtains the angle may be implemented in a plurality of manners. In a possible implementation, the terminal may obtain the angles corresponding to the plurality of candidate virtual objects according to the distances between the plurality of candidate virtual objects and the aiming point in the virtual scene, and the distances between the plurality of candidate virtual objects and the virtual object currently controlled by the terminal. In another possible implementation, the terminal may obtain the angles corresponding to the plurality of candidate virtual objects according to the distances between the projections of the plurality of candidate virtual objects and the aiming point on the terminal screen, and the distances between the plurality of candidate virtual objects and the virtual object currently controlled by the terminal. In an embodiment, the foregoing only uses two manners of obtaining the angles as an example for description, and the terminal may further adopt other manners. For example, the terminal may obtain, according to locations of the plurality of candidate virtual objects, the location of the virtual object currently controlled by the terminal, and a direction of the aiming point, a rotation angle of the viewing angle when the aiming point moves to a region in which the candidate virtual object is located through simulation calculation, that is, the angle. A specific manner of obtaining the angle is not limited in this embodiment of this application.

The foregoing only provides four exemplary implementations, and a process of selecting the target virtual object may alternatively be implemented in other manners. For example, the target virtual object may be selected according to a horizontal distance between the projections of the aiming point and the target virtual object on the terminal screen, and the horizontal distance may be a distance component of the distance between the projections of the aiming point and the target virtual object on the terminal screen in the horizontal direction. Similarly, the target virtual object may alternatively be selected according to a horizontal distance between the aiming point and the target virtual object in the virtual scene, and the horizontal distance may be a distance component of the distance between the aiming point and the target virtual object in the virtual scene in the horizontal direction. A specific representation manner is not limited in this embodiment of this application.

In step 305, the terminal obtains a first preset rotation speed of the viewing angle of the virtual scene according to the viewing-angle adjustment operation, and displays the target virtual scene based on the first preset rotation speed.

In a case that the foregoing virtual scene does not include the target virtual object, or the aiming point is located outside the adsorption region of the target virtual object, there is no target virtual object that needs assisted aiming, or the target virtual object in the field of view is too far away from the aiming point to satisfy a condition of providing the assisted aiming. Accordingly, the terminal may perform step 305 of performing a normal viewing-angle adjustment procedure based on the viewing-angle adjustment operation.

In this case, the terminal may obtain a first preset rotation speed. The first preset rotation speed is a normal rotation speed corresponding to the viewing-angle adjustment operation when the assisting aiming service is not provided. The terminal adjusts the viewing angle according to the first preset rotation speed, so as to display the target virtual scene after the viewing angle adjustment and provide assisting for this viewing-angle adjustment operation.

In a possible implementation, it may further be provided that: when the virtual scene is in a display mode based on an aiming tool, an assisting aiming service is provided; and when the virtual scene is not in the display mode based on an aiming tool, the assisting aiming service is not provided. In this case, before the foregoing step 302, when the viewing-angle adjustment operation is detected, the terminal may obtain a display mode of the virtual scene, and then the terminal may determine whether the display mode of the virtual scene is the display mode based on an aiming tool. When the virtual scene is in the display mode based on an aiming tool, the terminal performs step 302, that is, performs the operation of obtaining the adsorption region of the target virtual object; and when the virtual scene is not in the display mode based on an aiming tool, the terminal performs step 305, that is, obtains the first preset rotation speed of the viewing angle of the virtual scene according to the viewing-angle adjustment operation.

In the foregoing manner, it may be understood that, when the virtual object is aiming at the target virtual object, the terminal may provide an assisting for the virtual object. When the virtual object wants to aim at or shoot the target virtual object precisely, the virtual scene and the target virtual object in the virtual scene may be observed based on an aiming tool of a virtual prop. Therefore, an assisting aiming service is provided in this display mode, and in other display modes, the virtual object may move or observe the virtual scene, and does not want to aim at the target virtual object, so that the assisting aiming is not required to be provided.

In a possible implementation, an assisting aiming function may further be provided in a move and follow mode. Specifically, a fourth adsorption region may be set for the target virtual object, and the fourth adsorption region may be the same as any one of the first adsorption region, the second adsorption region, and the third adsorption region, or may be different from the foregoing three adsorption regions. The fourth adsorption region may be specifically set according to requirements, which is not limited in this embodiment of this application. In this implementation, when the aiming point is located in the fourth adsorption region of the target virtual object and the target virtual object has moved, the terminal may control the aiming point to follow the target virtual object to move.

Specifically, the terminal may obtain a movement speed and a movement direction of the target virtual object, and obtain a target follow speed and a target follow direction of the aiming point according to the movement speed and the movement direction of the target virtual object. In a specific possible embodiment, the target follow speed may be less than the movement speed of the target virtual object, and the target follow direction may be the same as the movement direction of the target virtual object.

Figure 8:
FIG. 8 is a schematic diagram of a terminal interface in which a target virtual object is moving according to an embodiment of this application.

For example, as shown in FIG. 8, the target virtual object is moving to the left, and the terminal may control the aiming point to move to the left synchronously, to follow the target virtual object.

Figure 9:
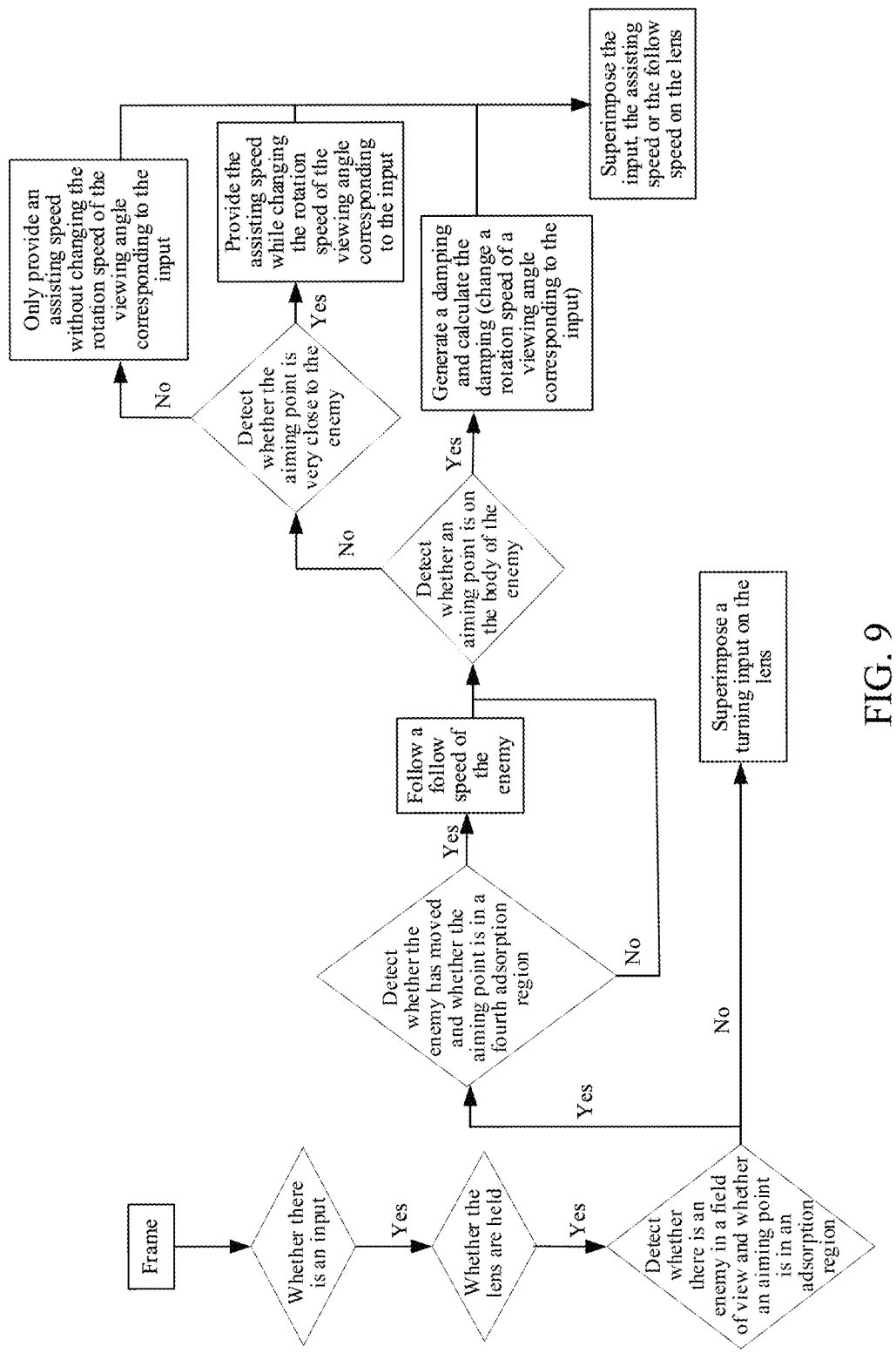
FIG. 9 is a flowchart of a viewing angle adjustment according to an embodiment of this application.

As shown in FIG. 9, in a specific example, the foregoing viewing-angle adjustment process may be embodied in a process of updating a lens direction for each frame (tick). The terminal may determine whether there is a lens turning input, that is, detect whether there is a viewing-angle adjustment operation. If there is the viewing-angle adjustment operation, the terminal may continue to determine whether the virtual object holds the lens. When the virtual object holds the lens, the virtual scene is in a display mode based on an aiming tool, and if the virtual object holds the lens, whether the aiming point is in an adsorption region of an enemy may be determined. If the aiming point is in the adsorption region, an assisting aiming may be provided, and specifically, different assisting aiming functions may be provided according to different locations of the aiming points. When the aiming point is relatively far away from the enemy, an adsorption speed may be provided. When the aiming point is relatively close to the enemy, a magnetic force may be generated for a magnetic force calculation. The magnetic force calculation is used for controlling the aiming point to follow the target virtual object. If the aiming point is on the body of an enemy, the damping may be generated for a damping calculation, for example, a damping coefficient may be added on the sensitivity to reduce the sensitivity, so as to reduce a rotation speed of the viewing angle.

In this embodiment of this application, when a viewing-angle adjustment operation is detected, if an aiming point is in an adsorption region of a target virtual object, an assisting aiming may be provided. A rotation speed of a viewing angle of a virtual scene is obtained by using the viewing-angle adjustment operation and locations of the aiming point and the target virtual object, so as to adjust the viewing angle to display the virtual scene. The foregoing process considers the viewing-angle adjustment operation, and provides the assisting aiming while respecting the user's operation, and a case that the virtual scene display is separated from the user's operation may be avoided. In this case, the user's requirements may be satisfied, the user's operation is respected, an assisting effect is provided, and a display effect is good.

The embodiment shown in FIG. 2 describes a specific procedure of providing an assisting aiming service in a case that a viewing-angle adjustment operation is detected. The foregoing method may further provide an assisting aiming function when the display mode of the virtual scene is switched, and a specific method may refer to an embodiment shown in FIG. 10.

Figure 10:
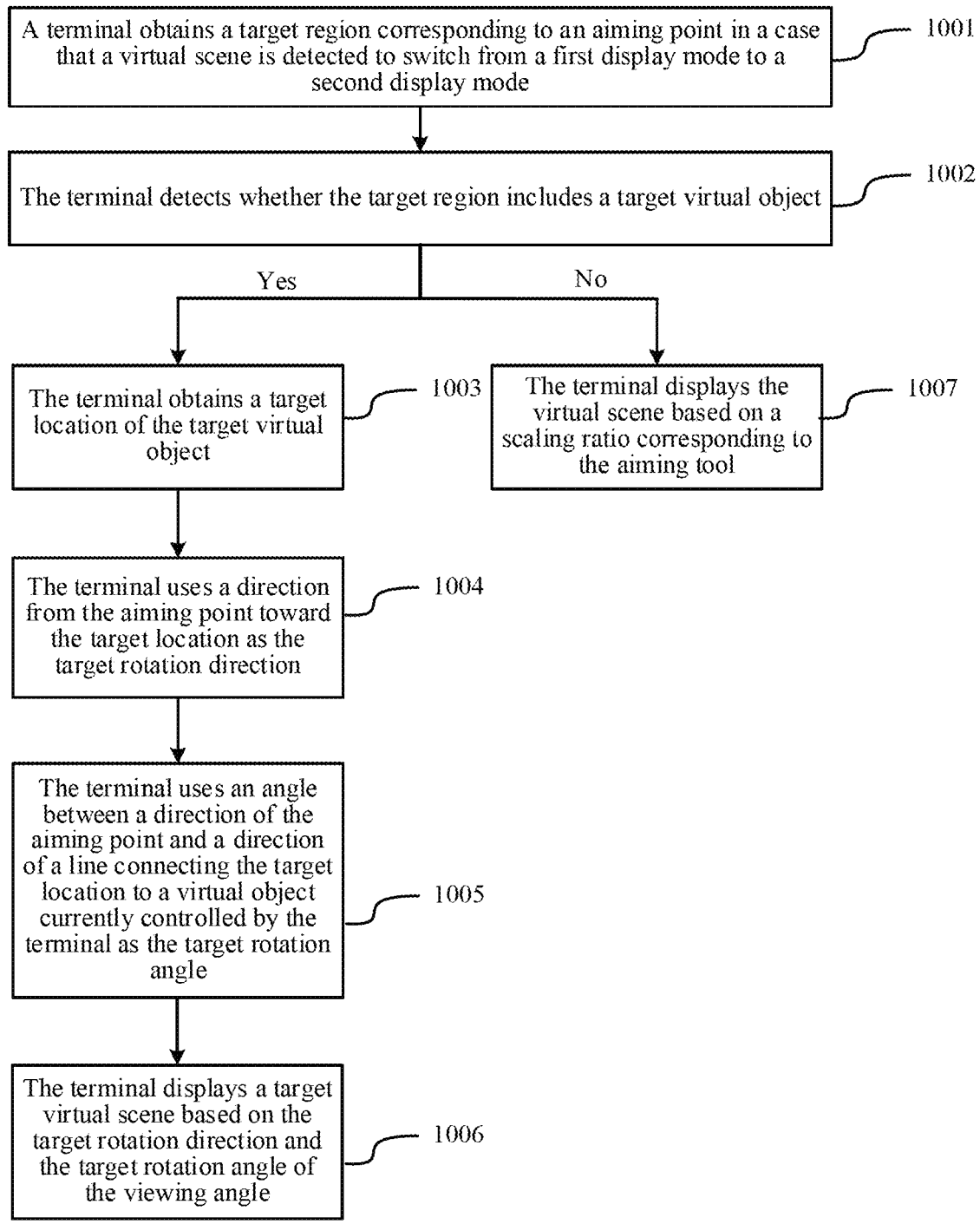
FIG. 10 is a flowchart of a virtual scene display method according to an embodiment of this application.

FIG. 10 is a flowchart of a virtual scene display method according to an embodiment of this application. Referring to FIG. 10, the method may include the following operations.

In step 1001, the terminal obtains a target region corresponding to an aiming point in a case that a virtual scene is detected to switch from a first display mode to a second display mode.

The second display mode is a display mode based on an aiming tool, and FIG. 2 shows a virtual scene in a second display mode. The first display mode is another display mode than the second display mode. FIG. 1 shows a virtual scene in a first display mode.

When the display mode of the virtual scene is switched from the first display mode to the second display mode, the virtual object may want to aim at or shoot another virtual object in the virtual scene. In this case, the terminal may determine whether there is another virtual object near the aiming point, and if there is another virtual object, an assisting aiming service may be provided, and the aiming point is moved to a region in which the another virtual object is located.

Specifically, a target region corresponding to the aiming point may be set, and the target region is a region near the aiming point, that is, the target region is a region whose distance from the aiming point satisfies a certain condition. When the display mode of the virtual scene is switched from the first display mode to the second display mode, the target region may be obtained, and therefore, whether to provide the assisting aiming service is determined according to whether the target region includes another virtual object. For example, the target region may be a region whose distance from the aiming point is less than a distance threshold. The distance threshold may be preset according to requirements, which is not limited in this embodiment of this application.

The process in which the terminal obtains the target region may include the terminal obtaining a target region using the aiming point as a center and using a preset size as a size. The preset size may be set, which is not limited in this embodiment of this application.

Figure 11:
FIG. 11 is a schematic diagram of a target region corresponding to an aiming point according to an embodiment of this application.

In a specific possible embodiment, the target region may be a circular region using the aiming point as a center of a circle and using a target radius as a radius. Correspondingly, the process in which the terminal obtains the target region may include the terminal obtaining a circular region using the aiming point as a center of a circle and using a target radius as a radius. In an embodiment, the target region may be in another shape, for example, may be a polygonal region. Only an example in which the target region may be a circular region is used for description herein, and the shape of the target region is not limited in this embodiment of this application. For example, as shown in FIG. 11, the target region may be a circular region using the aiming point as a center.

In step 1002, the terminal detects whether the target region includes a target virtual object, and performs step

1003 if the target region includes a target virtual object, and performs step 1007 if the target region does not include a target virtual object.

After obtaining the target region corresponding to the aiming point, the terminal may determine whether the target region includes a target virtual object, so as to determine whether to provide an assisting aiming service according to a determining result. It may be understood that, if the target region does not include a target virtual object, that is, there is no another virtual object near the aiming point, and therefore, an assisting aiming service is not required to be provided, the following step 1007 of directly switching a display mode may be performed. For example, as shown in FIG. 11, the target region includes a target virtual object, an assisting aiming service may be provided. However, if the target region includes a target virtual object, that is, there is another virtual object near the aiming point, the virtual object may want to switch the display mode to aim at the another virtual object, and therefore, the assisting aiming service may be provided, and the following step 1003 to step 1006 may be performed.

In a possible implementation, the target virtual object may be any another virtual object than the virtual object currently controlled by the terminal. In another possible implementation, the virtual object currently controlled by the terminal may also team up with other virtual objects. Generally, as a virtual object in the same team, the virtual object currently controlled by the terminal does not need to aim at or shoot the other virtual objects in the same team. Therefore, the target virtual object may alternatively be any virtual object that is in a team different from the team to which the virtual object currently controlled by the terminal belongs. A specific determining manner of the target virtual object is not limited in this embodiment of this application.

In a possible scenario, the target region may further include a plurality of other virtual objects. The plurality of other virtual objects are all candidate virtual objects. That is, any one of the candidate virtual objects may be selected as a target virtual object. In this scenario, the terminal may select one from the plurality of candidate virtual objects as the target virtual object, so as to provide an assisting aiming service in a process of aiming at the target virtual object.

Specifically, when the target region includes a plurality of candidate virtual objects, the terminal selects a candidate virtual object from the plurality of candidate virtual objects as the target virtual object. The terminal performs the following step 1003 to step 1005 based on the selected target virtual object, that is, performs an operation of obtaining a target rotation direction and a target rotation angle of a viewing angle of the virtual scene according to a location of the target virtual object and a location of the aiming point.

A process in which the terminal selects the target virtual object from the plurality of candidate virtual objects may be implemented through any manner, such as the following.

In manner 1, the terminal randomly selects a candidate virtual object from the plurality of candidate virtual objects as the target virtual object.

In manner 2, the terminal selects a candidate virtual object closest to the aiming point as the target virtual object according to distances between the plurality of candidate virtual objects and the aiming point in the virtual scene.

In manner 3, the terminal selects a candidate virtual object closest to the aiming point as the target virtual object according to distances between locations of projections of the plurality of candidate virtual objects and the aiming point on a terminal screen.

In manner 4, the terminal selects, according to angles between directions of lines connecting the plurality of candidate virtual objects to a virtual object currently controlled by the terminal and a direction of the aiming point, a candidate virtual object with a minimum angle as the target virtual object.

In the manner 4, the terminal may obtain the angles, and then select a candidate virtual object with a minimum angle as the target virtual object. A process in which the terminal obtains the angle may be implemented in a plurality of manners. In a possible implementation, the terminal may obtain the angles corresponding to the plurality of candidate virtual objects according to the distances between the plurality of candidate virtual objects and the aiming point in the virtual scene, and the distances between the plurality of candidate virtual objects and the virtual object currently controlled by the terminal. In another possible implementation, the terminal may obtain the angles corresponding to the plurality of candidate virtual objects according to the distances between the projections of the plurality of candidate virtual objects and the aiming point on the terminal screen, and the distances between the plurality of candidate virtual objects and the virtual object currently controlled by the terminal. The foregoing only uses two manners of obtaining the angles as an example for description, and the terminal may further adopt other manners. For example, the terminal may obtain, according to locations of the plurality of candidate virtual objects, the location of the virtual object currently controlled by the terminal, and a direction of the aiming point, a rotation angle of the viewing angle when the aiming point moves to a region in which the candidate virtual object is located through simulation calculation, that is, the angle. A specific manner of obtaining the angle is not limited in this embodiment of this application.

The foregoing only provides four exemplary implementations, and a process of selecting the target virtual object may alternatively be implemented in other manners. For example, the target virtual object may be selected according to a horizontal distance between the projections of the aiming point and the target virtual object on the terminal screen, and the horizontal distance may be a distance component of the distance between the projections of the aiming point and the target virtual object on the terminal screen in the horizontal direction. Similarly, the target virtual object may alternatively be selected according to a horizontal distance between the aiming point and the target virtual object in the virtual scene, and the horizontal distance may be a distance component of the distance between the aiming point and the target virtual object in the virtual scene in the horizontal direction. A specific representation manner is not limited in this embodiment of this application.

In step 1003, the terminal obtains a target location of the target virtual object.

After determining to provide an assisting aiming service, the terminal may first obtain a target location of the target virtual object, the target location being a location to which the aiming point wants to move, so as to determine how to rotate a viewing angle based on the target location and a current location of the aiming point, and to display a target virtual scene after the rotation.

Specifically, the target location may be obtained in a plurality of manners. The target location may be obtained based on a location relationship between the aiming point and the target virtual object. The target location may alternatively be a fixed location on the body of the target virtual object. The following describes an obtaining process of the target location in three manners, and the terminal may adopt any one of the manners to obtain the target location.

In manner 1, the terminal obtains the target location of the target virtual object according to a relationship between locations of projections of the aiming point and the target virtual object on a terminal screen in a horizontal direction. In the manner 1, the terminal may obtain locations of projections of the aiming point and the target virtual object on the terminal screen according to the location of the aiming point and the location of the target virtual object, so as to obtain the target location of the target virtual object according to the relationship between the projection locations of the aiming point and the target virtual object in the horizontal direction.

Specifically, the relationship between the projection locations of the aiming point and the target virtual object in the horizontal direction may include two cases. Correspondingly, in the manner 1, processes in which the terminal obtains the target location may be different, and specifically include the following cases.

In case 1, the terminal uses, in a case that a horizontal location of a projection location of the aiming point in the horizontal direction is located in a horizontal location range of a projection location of the target virtual object in the horizontal direction, a location that is the same as the horizontal location of the aiming point and that is in the horizontal location range as the target location of the target virtual object. That is, in this case, a location that is in the horizontal location range and on the target virtual object is used as the target location on the target virtual object.

If it is determined according to the projection locations of the two that the aiming point may move to the body of the target virtual object along the horizontal direction, a location corresponding to the horizontal location of the projection location of the aiming point may be directly used as the target location. In the case 1, after obtaining the target location, the aiming point may be controlled to only move along the horizontal direction.

In case 2, the terminal uses, in a case that a horizontal location of a projection location of the aiming point in the horizontal direction is located outside a horizontal location range of a projection location of the target virtual object in the horizontal direction, a location on the target virtual object corresponding to the horizontal location of the aiming point or a location of a target part of the target virtual object as the target location of the target virtual object.

In the case 2, it is determined according to the projection locations of the aiming point and the target virtual object that the aiming point cannot move to the body of the target virtual object along the horizontal direction. In a possible implementation, when the relationship between the horizontal location of the aiming point and the horizontal location range differs, the horizontal location may alternatively correspond to different locations. For example, when the horizontal location is above the horizontal location range, a location of a first part of the target virtual object may be used as the target location; and when the horizontal location is under the horizontal location range, a location of a second part of the target virtual object may be used as the target location. The first part and the second part may be set. For example, the first part may be the head, and the second part may be the feet. In an embodiment, the first part and the second part may be other parts, for example, the first part may alternatively be the chest, and the second part may alternatively be the legs. This is not limited in this embodiment of this application.

In another possible implementation, the terminal may also obtain a fixed location (a location of a target part) on the body of the target virtual object as the target location. For example, the location of the target part may be a location of the head or the neck, or may be a location of another part, for example, a center location. This is not limited in this embodiment of this application.

In manner 2, the terminal obtains the target location of the target virtual object according to a relationship between horizontal locations of the aiming point and the target virtual object in the virtual scene. In the manner 2, the terminal may obtain a relationship between the locations of the aiming point and the target virtual object in the horizontal direction according to the locations of the aiming point and the target virtual object in the virtual scene, so as to obtain the target location of the target virtual object according to the location relationship.

Similar to the foregoing manner 1, the relationship between the locations of the aiming point and the target virtual object in the virtual scene in the horizontal direction may include two cases. Correspondingly, in the manner 2, processes in which the terminal obtains the target location may differ, and specifically include the following cases.

In case 1, the terminal uses, in a case that the horizontal location of the location of the aiming point in the virtual scene in the horizontal direction is located in the horizontal location range of the location of the target virtual object in the virtual scene in the horizontal direction, a location on the target virtual object that is in the horizontal location range as the target location of the target virtual object.

If it is determined according to the locations of the two that the aiming point may move to the body of the target virtual object along the horizontal direction, a location corresponding to the horizontal location of the aiming point may be directly used as the target location. In the case 1, after obtaining the target location, the aiming point may be controlled to only move along the horizontal direction.

In case 2, the terminal uses, in a case that the horizontal location of the location of the aiming point in the virtual scene in the horizontal direction is located outside the horizontal location range of the location of the target virtual object in the virtual scene in the horizontal direction, a location on the target virtual object corresponding to the horizontal location of the aiming point or a location of a target part of the target virtual object as the target location of the target virtual object.

In the case 2, it is determined according to the locations of the aiming point and the target virtual object in the virtual scene that the aiming point cannot move to the body of the target virtual object along the horizontal direction. In a possible implementation, when the relationship between the horizontal location of the aiming point and the horizontal location range differs, the horizontal location may alternatively correspond to different locations. For example, when the horizontal location is above the horizontal location range, a location of a first part of the target virtual object may be used as the target location; and when the horizontal location is under the horizontal location range, a location of a second part of the target virtual object may be used as the target location. The first part and the second part may be set. For example, the first part may be the head, and the second part may be the feet. In an embodiment, the first part and the second part may be other parts, for example, the first part may alternatively be the chest, and the second part may alternatively be the legs. This is not limited in this embodiment of this application.

In another possible implementation, the terminal may also obtain a fixed location (a location of a target part) on the body of the target virtual object as the target location. For example, the location of the target part may be a location of the head or the neck, or may be a location of another part, for example, a center location. This is not limited in this embodiment of this application.

In manner 3, the terminal obtains a location of a target part of the target virtual object as the target location.

In the manner 3, the terminal may not need to determine the location relationship between the aiming point and the target virtual object, and directly uses the fixed location (the location of the target part) on the body of the target virtual object as the target location. The target part may be preset, which is not limited in this embodiment of this application.

The foregoing only provides three exemplary manners, and the process of obtaining a target location of the target virtual object may alternatively be implemented in other manners. For example, the target location may be determined according to a location relationship between locations of the aiming point and the target virtual object in the virtual scene in a vertical direction or a location relationship between locations of projections of the aiming point and the target virtual object on the terminal screen in the vertical direction. A specific manner is not limited in this embodiment of this application.

In step 1004, the terminal uses a direction from the aiming point toward the target location as the target rotation direction.

In the foregoing step 1003, after obtaining the target location of the target virtual object, because the target location is a location to which the aiming point wants to move, the terminal may use a direction from the aiming point to the target location as a target rotation direction of the viewing angle of the virtual scene.

In step 1005, the terminal uses an angle between a direction of the aiming point and a direction of a line connecting the target location to a virtual object currently controlled by the terminal as the target rotation angle.

In the foregoing step 1003, after obtaining the target location of the target virtual object, because the target location is a location to which the aiming point wants to move, the terminal may directly obtain a target rotation angle of the viewing angle based on the location of the aiming point and the target location. When the viewing angle rotates for the target rotation angle, the aiming point may be moved to the target location.

The direction of the aiming point is a direction of the viewing angle, and after the viewing-angle adjustment, the aiming point needs to be moved to the target location. Therefore, a target direction of the viewing angle after the viewing-angle adjustment is the direction of the line connecting the target location and the virtual object currently controlled by the terminal, and the angle between the location of the aiming point and the direction of the line is the target rotation angle.

Step 1004 and step 1005 are a process of obtaining a target rotation direction and a target rotation angle of the viewing angle of the virtual scene according to the location of the aiming point and the target location on the target virtual object. The terminal may first perform step 1004 and then perform step 1005, or may first perform step 1005 and then perform step 1004. In an embodiment, the terminal may perform step 1004 and step 1005 simultaneously. An execution order of step 1004 and step 1005 is not limited in this embodiment of this application.

Step 1003 to step 1005 are a process of obtaining a target rotation direction and a target rotation angle of the viewing angle of the virtual scene according to the location of the target virtual object and the location of the aiming point. In the process, the terminal first obtains a target location of the target virtual object, and then obtains the target rotation direction and the target rotation angle based on the target location and the location of the aiming point.

In step 1006, the terminal displays a target virtual scene based on the target rotation direction and the target rotation angle of the viewing angle, the aiming point in the target virtual scene being located in a region in which the target virtual object is located.

The terminal may obtain a target virtual scene according to a target rotation direction and a target rotation angle of the viewing angle, so as to display the target virtual scene. The process is that, the terminal adjusts the viewing angle based on the target rotation direction and the target rotation angle, and displays the adjusted target virtual scene.

In a possible implementation, the terminal may further obtain the target virtual scene according to the target rotation direction and target rotation angle of the viewing angle and a scaling ratio corresponding to an aiming tool, so as to display the target virtual scene. The target virtual scene is a virtual scene scaled according to the scaling ratio, and the aiming point in the target virtual scene is located in the region in which the target virtual object is located.

Figure 12:
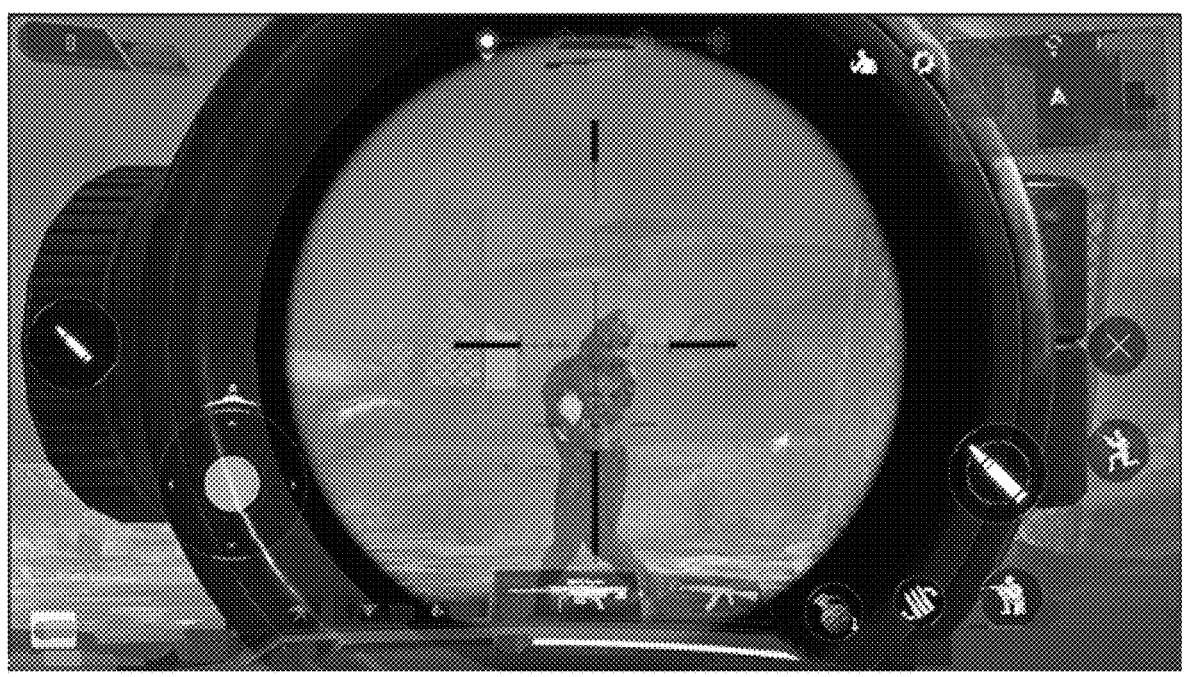
FIG. 12 is a schematic diagram of a target virtual scene according to an embodiment of this application.

For example, when the user switches a display mode of the virtual scene to a display mode based on an aiming tool, a target region corresponding to the aiming point shown in FIG. 11 includes a target virtual object. Therefore, the terminal may control the viewing angle to rotate, to display a target virtual scene shown in FIG. 12. In the target virtual scene, the aiming point is moved to the body of the target virtual object.

In step 1007, the terminal displays the virtual scene based on the scaling ratio corresponding to the aiming tool.

In the foregoing step 1002, when the terminal detects that the target region does not include a target virtual object and there is no other virtual objects near the aiming point, an assisting aiming service is not required to be provided. Therefore, the terminal may directly perform a scaling display on the current virtual scene according to the scaling ratio corresponding to the aiming tool.

In this embodiment of this application, when a display mode of a virtual scene is switched to a display mode based on an aiming tool, if a region corresponding to an aiming point includes a target virtual object, a viewing angle may be controlled to rotate to move the aiming point to the region in which the target virtual object is located, so as to help a user aim at the target virtual object near the aiming point during a process of switching a display mode. A user's operation of switching a display mode is considered, and an assisting aiming service is provided based on the user's operation, without ignoring the user's operation to directly drag and drop the aiming point. Therefore, the foregoing virtual scene display process is closely correlated to the user's operation, user's requirements may be satisfied, and a display effect is good.

All of the above exemplary technical solutions may be variously combined to form exemplary embodiments of this application. Details are not described herein again.

In a possible implementation, in the embodiment shown in FIG. 3, step 302 of obtaining an adsorption region of the target virtual object is performed when the virtual scene is in the display mode based on an aiming tool, and an assisting aiming service is provided. When the virtual scene is not in the display mode based on an aiming tool, the assisting aiming service is not provided. Combining the embodiments shown in FIG. 3 and the embodiment shown in FIG. 10, a possible scenario may be included: when the virtual scene is not in the display mode based on an aiming tool, the user performs a viewing-angle adjustment operation; and after detecting the viewing-angle adjustment operation, the terminal may obtain a rotation speed of the viewing angle of the virtual scene according to the viewing-angle adjustment operation, so as to adjust the viewing angle and display the adjusted virtual scene. The user continues to operate on the terminal to perform a display mode switch operation, to switch the display mode from the first display mode to the second display mode, the second display mode being the foregoing display mode based on an aiming tool. In the switching process, the terminal may obtain a corresponding target region based on the location of the aiming point. If the target region includes a target virtual object, a target rotation direction and a target rotation angle of a viewing angle of the virtual scene may be obtained, and therefore, an aiming point in the adjusted virtual scene is on the target virtual object, thereby implementing an effect of moving the aiming point to the body of the target virtual object near the aiming point in an operation process of holding the lens. When the virtual scene is in the display mode based on an aiming tool and the viewing-angle adjustment operation is detected, if an aiming point of a virtual object currently controlled by the terminal is located in the adsorption region of the target virtual object, the assisting aiming may be provided. The locations of the aiming point and the target virtual object and the viewing-angle adjustment operation may be considered comprehensively to obtain the target rotation speed of the viewing angle of the virtual scene, so as to adjust the viewing angle based on the target rotation speed and to display the adjusted virtual scene.

Figure 13:
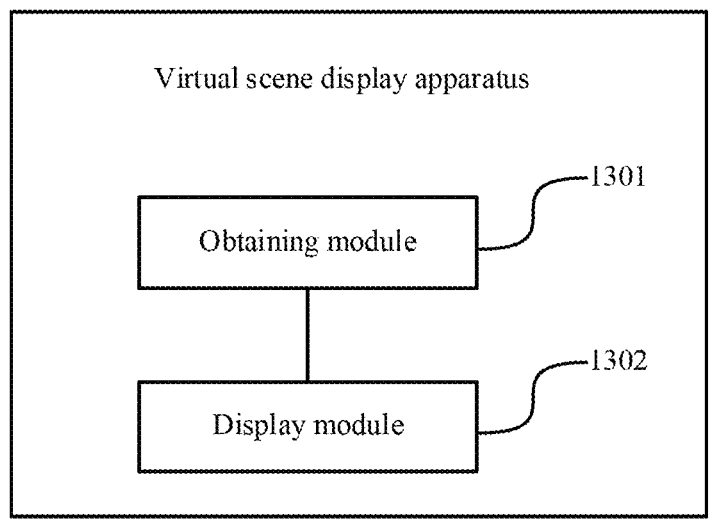
FIG. 13 is a schematic structural diagram of a virtual scene display apparatus according to an embodiment of this application.

All of the above exemplary technical solutions may be variously combined to form exemplary embodiments of this application. Details are not described herein again. FIG. 13 is a schematic structural diagram of a virtual scene display apparatus according to an embodiment of this application. Referring to FIG. 13, the apparatus may include an obtaining module 1301 and a display module 1302. One or more of the modules, submodules, and/or units can be implemented by processing circuitry, software, or a combination thereof, for example.

The obtaining module 1301 is configured to obtain an adsorption region of a target virtual object in response to detection of a viewing-angle adjustment operation. The obtaining module 1301 is further configured to obtain, in response to a determination that an aiming point is located in the adsorption region of the target virtual object, a target rotation speed of a viewing angle of a virtual scene according to a location of the aiming point, a location of the target virtual object, and the viewing-angle adjustment operation. The display module 1302 is configured to display a target virtual scene based on the target rotation speed of the viewing angle.

In a possible implementation, the apparatus further includes a detection module and the obtaining module 1301. The detection module is configured to detect whether the virtual scene includes the target virtual object. The obtaining module 1301 is further configured to perform the operation of obtaining an adsorption region of the target virtual object when the virtual scene includes the target virtual object. The obtaining module 1301 is further configured to obtain a first preset rotation speed of the viewing angle of the virtual scene according to the viewing-angle adjustment operation in response to a determination that the virtual scene does not include the target virtual object.

In a possible implementation, the obtaining module 1301 is configured to obtain, in response to a determination that the aiming point is located in the adsorption region of the target virtual object, a first rotation speed of the viewing angle of the virtual scene according to the viewing-angle adjustment operation. The obtaining module 1301 is also configured to obtain a second rotation speed of the viewing angle of the virtual scene according to the location of the aiming point and the location of the target virtual object, a direction of the second rotation speed being from the aiming point toward the target virtual object. The obtaining module 1301 is also configured to obtain a target rotation speed of the viewing angle of the virtual scene based on the first rotation speed and the second rotation speed.

In a possible implementation, the obtaining module 1301 is configured to obtain, in response to a determination that the aiming point is located in a first adsorption sub-region of the target virtual object, a first preset rotation speed of the viewing angle of the virtual scene according to the viewing-angle adjustment operation.

The obtaining module 1301 is also configured to obtain, in response to a determination that the aiming point is located in a second adsorption sub-region of the target virtual object, a second preset rotation speed of the viewing angle of the virtual scene according to the viewing-angle adjustment operation, the second preset rotation speed being less than the first preset rotation speed.

The obtaining module 1301 is also configured to obtain, in response to a determination that the aiming point is located in a third adsorption sub-region of the target virtual object, a third preset rotation speed of the viewing angle of the virtual scene according to the viewing-angle adjustment operation, the third preset rotation speed being less than the first preset rotation speed, and the third preset rotation speed being different from the second preset rotation speed.

The first adsorption sub-region surrounds the second adsorption sub-region, and the second adsorption region surrounds the third adsorption sub-region.

In a possible implementation, the obtaining module 1301 is configured to obtain a second rotation speed of the viewing angle of the virtual scene according to a distance between projections of the target virtual object and the aiming point on a terminal screen.

Alternatively, the obtaining module 1301 is configured to obtain a second rotation speed of the viewing angle of the virtual scene according to a distance between the target virtual object and the aiming point in the virtual scene.

Alternatively, the obtaining module 1301 is configured to obtain a second rotation speed of the viewing angle of the virtual scene according to an angle between a direction of a line connecting a virtual object currently controlled by the terminal to the target virtual object and a direction of the aiming point.

In a possible implementation, the second rotation speed is in a negative correlation with the distance between the projections of the target virtual object and the aiming point on the terminal screen; or the second rotation speed is in a negative correlation with the distance between the target virtual object and the aiming point in the virtual scene; or the second rotation speed is in a negative correlation with the angle.

In a possible implementation, the obtaining module 1301 is further configured to obtain a distance between the virtual object currently controlled by the terminal and the target virtual object.

In an embodiment, the obtaining module 1301 is further configured to obtain the second rotation speed of the viewing angle of the virtual scene according to the distance between the virtual object currently controlled by the terminal and the target virtual object and the distance between the projections of the target virtual object and the aiming point on the terminal screen, the second rotation speed being in a negative correlation with the distance between the virtual object currently controlled by the terminal and the target virtual object.

In an alternative embodiment, the obtaining module 1301 is further configured to obtain the second rotation speed of the viewing angle of the virtual scene according to the distance between the virtual object currently controlled by the terminal and the target virtual object and the distance between the target virtual object and the aiming point in the virtual scene, the second rotation speed being in a negative correlation with the distance between the virtual object currently controlled by the terminal and the target virtual object.

In a possible implementation, the obtaining module 1301 is further configured to perform, in response to a determination that the aiming point is located in a first adsorption sub-region or a second adsorption sub-region of the target virtual object, the operation of obtaining the second rotation speed of the viewing angle of the virtual scene according to the location of the aiming point and the location of the target virtual object. The obtaining module 1301 is further configured to use, in response to a determination that the aiming point is located in a third adsorption sub-region of the target virtual object, the first rotation speed as the target rotation speed of the viewing angle of the virtual scene.

In a possible implementation, the obtaining module 1301 is further configured to obtain the second rotation speed of the viewing angle of the virtual scene according to the location of the aiming point, the location of the target virtual object, and an operation direction of the viewing-angle adjustment operation.

In a possible implementation, the obtaining module 1301 is further configured to: obtain, in response to a determination that the operation direction of the viewing-angle adjustment operation indicates that the aiming point moves toward the target virtual object, a third rotation speed as the second rotation speed of the viewing angle of the virtual scene according to the location of the aiming point, the location of the target virtual object, and a first parameter. The obtaining module 1301 is further configured to obtain, in response to a determination that the operation direction of the viewing-angle adjustment operation indicates that the aiming point moves in a direction away from the target virtual object, a fourth rotation speed as the second rotation speed of the viewing angle of the virtual scene according to the location of the aiming point, the location of the target virtual object, and a second parameter. The fourth rotation speed is less than the third rotation speed.

In a possible implementation, the obtaining module 1301 is configured to control the aiming point to move with the target virtual object in response to a determination that the aiming point is located in a fourth adsorption sub-region of the target virtual object and the target virtual object has moved.

In a possible implementation, the obtaining module 1301 is further configured to obtain a display mode of the virtual scene in a case that the viewing-angle adjustment operation is detected. The obtaining module 1301 is further configured to perform, in response to a determination that the virtual scene is in a display mode based on an aiming tool, the operation of obtaining an adsorption region of a target virtual object.

The obtaining module 1301 is further configured to obtain, in response to a determination that the virtual scene is not in the display mode based on an aiming tool, a first rotation speed of the viewing angle of the virtual scene according to the viewing-angle adjustment operation.

In a possible implementation, the obtaining module 1301 is further configured to obtain an adsorption region of the target virtual object according to a distance between the virtual object currently controlled by the terminal and the target virtual object, a size of the adsorption region being in a positive correlation with the distance.

In a possible implementation, the apparatus further includes a selection module, configured to select, in response to a determination that the aiming point is located in adsorption regions of a plurality of candidate virtual objects, a candidate virtual object from the plurality of candidate virtual objects as the target virtual object, The apparatus also includes the obtaining module 1301 being further configured to perform, based on the selected target virtual object, the operation of obtaining a target rotation speed of the viewing angle of the virtual scene according to a location of the aiming point, a location of the target virtual object, and the viewing-angle adjustment operation.

In a possible implementation, the selection module is configured to randomly select a candidate virtual object from the plurality of candidate virtual objects as the target virtual object.

Alternatively, the selection module is further configured to select a candidate virtual object closest to the aiming point as the target virtual object according to distances between the plurality of candidate virtual objects and the aiming point in the virtual scene.

Alternatively, the selection module is further configured to select a candidate virtual object closest to the aiming point as the target virtual object according to distances between locations of projections of the plurality of candidate virtual objects and the aiming point on a terminal screen.

Alternatively, the selection module is further configured to select, according to angles between directions of lines connecting the plurality of candidate virtual objects to a virtual object currently controlled by the terminal and a direction of the aiming point, a candidate virtual object with a minimum angle as the target virtual object.

According to the apparatus in this embodiment of this application, when a viewing-angle adjustment operation is detected, if an aiming point is in an adsorption region of a target virtual object, an assisting aiming may be provided. A rotation speed of a viewing angle of a virtual scene is obtained by using the viewing-angle adjustment operation and locations of the aiming point and the target virtual object, so as to adjust the viewing angle to display the virtual scene. The foregoing process considers the viewing-angle adjustment operation, and provides the assisting aiming while respecting the user's operation, and a case that the virtual scene display is separated from the user's operation may be avoided. In this case, the user's requirements may be satisfied, the user's operation is respected, an assisting effect is provided, and a display effect is good.

The division of the above functional modules is only described for exemplary purposes when the virtual scene display apparatus provided in the foregoing embodiment displays a virtual scene. In actual application, the functions may be allocated to different functional modules according to specific needs, which means that the internal structure of the electronic device is divided into different functional modules to complete all or some of the above described functions. Within the electronic device, the above described functions may be implemented by processing circuitry, software, or a combination thereof, for example. In addition, the virtual scene display apparatus provided in the foregoing embodiment belongs to the same concept as the virtual scene display method embodiment. For a specific implementation process of the apparatus, refer to the method embodiment. Details are not described herein again.

Figure 14:
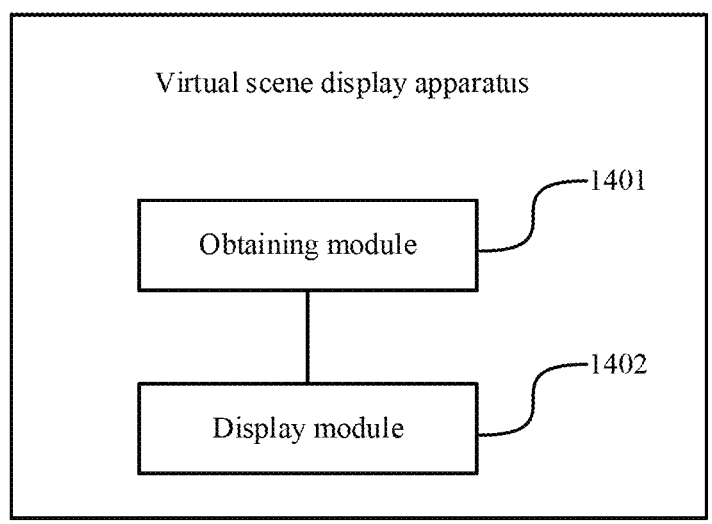
FIG. 14 is a schematic structural diagram of a virtual scene display apparatus according to an embodiment of this application.

FIG. 14 is a schematic structural diagram of a virtual scene display apparatus according to an embodiment of this application. Referring to FIG. 14, the apparatus may include an obtaining module 1401 and a display module 1402.

The obtaining module 1401 is configured to obtain a target region corresponding to an aiming point in response to a determination that a virtual scene is detected to switch from a first display mode to a second display mode. The second display mode is a display mode based on an aiming tool, the first display mode being another display mode other than the second display mode.

The obtaining module 1401 is further configured to obtain, in response to a determination that the target region includes a target virtual object, a target rotation direction and a target rotation angle of a viewing angle of the virtual scene according to a location of the target virtual object and a location of the aiming point.

The display module 1402 is configured to display a target virtual scene based on the target rotation direction and the target rotation angle of the viewing angle, the aiming point in the target virtual scene being located in a region in which the target virtual object is located.

In a possible implementation, the obtaining module 1401 is configured to obtain a target location of the target virtual object.

The obtaining module 1401 is also configured to obtain a target rotation direction and a target rotation angle of the viewing angle of the virtual scene according to the location of the aiming point and the target location.

In a possible implementation, the obtaining module 1401 is configured to obtain the target location of the target virtual object according to a relationship between locations of projections of the aiming point and the target virtual object on a terminal screen in a horizontal direction.

Alternatively, the obtaining module 1401 is configured to obtain the target location of the target virtual object according to a relationship between horizontal locations of the aiming point and the target virtual object in the virtual scene.

Alternatively, the obtaining module 1401 is configured to obtain a location of a target part of the target virtual object as the target location.

In a possible implementation, the obtaining module 1401 is configured to use, in a response to a determination that a horizontal location of a projection location of the aiming point in a horizontal direction is located in a horizontal location range of a projection location of the target virtual object in the horizontal direction, a location on the target virtual object that is in the horizontal location range as the target location of the target virtual object.

Alternatively, the obtaining module 1401 is configured to use, in response to a determination that a horizontal location of a projection location of the aiming point in the horizontal direction is located outside a horizontal location range of a projection location of the target virtual object in the horizontal direction, a location corresponding to the horizontal location of the aiming point or a location of a target part of the target virtual object as the target location of the target virtual object.

In a possible implementation, the obtaining module 1401 is configured to use a direction from the aiming point toward the target location as the target rotation direction.

The obtaining module 1401 is also configured to use an angle between a direction of the aiming point and a direction of a line connecting the target location to a virtual object currently controlled by the terminal as the target rotation angle.

In a possible implementation, the obtaining module 1401 is configured to obtain a target region using the aiming point as a center and using a preset size as a size.

In a possible implementation, the apparatus further includes a selection module and the obtaining module 1401.

The selection module is configured to select, in response to a determination that the target region includes a plurality of candidate virtual objects, a candidate virtual object from the plurality of candidate virtual objects as the target virtual object.

The obtaining module 1401 is further configured to perform, based on the selected target virtual object, the operation of obtaining a target rotation direction and a target rotation angle of a viewing angle of the virtual scene according to a location of the target virtual object and a location of the aiming point.

In a possible implementation, the selection module is configured to randomly select a candidate virtual object from the plurality of candidate virtual objects as the target virtual object.

Alternatively, the selection module is configured to select a candidate virtual object closest to the aiming point as the target virtual object according to distances between the plurality of candidate virtual objects and the aiming point in the virtual scene.

Alternatively, the selection module is configured to select a candidate virtual object closest to the aiming point as the target virtual object according to distances between locations of projections of the plurality of candidate virtual objects and the aiming point on a terminal screen.

Alternatively, the selection module is configured to select, according to angles between directions of lines connecting the plurality of candidate virtual objects to a virtual object currently controlled by the terminal and a direction of the aiming point, a candidate virtual object with a minimum angle as the target virtual object.

According to the apparatus in this embodiment of this application, when a display mode of a virtual scene is switched to a display mode based on an aiming tool, and if a region corresponding to an aiming point includes a target virtual object, a viewing angle may be controlled to rotate to move the aiming point to the region in which the target virtual object is located. The apparatus is to help a user aim at the target virtual object near the aiming point during a process of switching a display mode. A user's operation of switching a display mode is considered, and an assisting aiming service is provided based on the user's operation, without ignoring the user's operation to directly drag and drop the aiming point. Therefore, the foregoing virtual scene display process is closely correlated to the user's operation, user's requirements may be satisfied, and a display effect is good.

The division of the above functional modules is only described for exemplary purposes when the virtual scene display apparatus provided in the foregoing embodiment displays a virtual scene. In actual application, the functions may be allocated to different functional modules according to specific needs, which means that the internal structure of the electronic device is divided into different functional modules to complete all or some of the above described functions. Within the electronic device, the above described functions may be implemented by processing circuitry, software, or a combination thereof, for example. In addition, the virtual scene display apparatus provided in the foregoing embodiment belongs to the same concept as the virtual scene display method embodiment. For a specific implementation process of the apparatus, refer to the method embodiment. Details are not described herein again.

Figure 15:
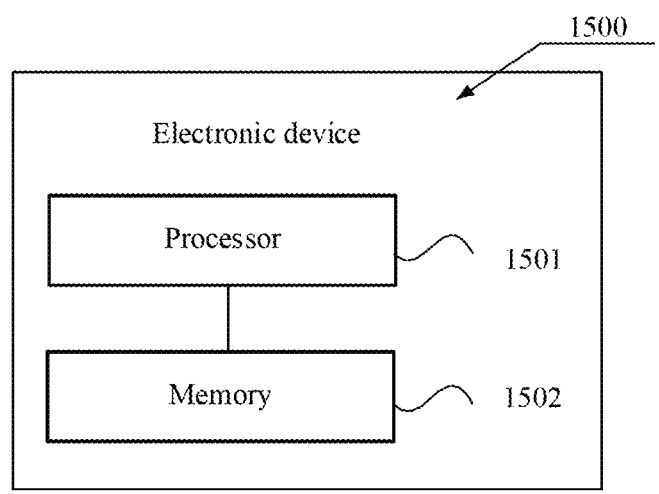
FIG. 15 is a schematic structural diagram of an electronic device according to an embodiment of this application.

FIG. 15 is a schematic structural diagram of an electronic device according to an embodiment of this application. The electronic device 1500 may vary greatly due to different configurations or performance, and may include one or more processors (for example, central processing units, CPU) 1501 and one or more memories 1502. The memory 1502 stores at least one instruction.

In a possible implementation, the at least one instruction is loaded and executed by the processor 1501 to implement the following functions: obtaining an adsorption region of a target virtual object in response to detecting a viewing-angle adjustment operation; obtaining, in response to a determination that an aiming point is located in the adsorption region of the target virtual object, a target rotation speed of a viewing angle of a virtual scene according to a location of the aiming point, a location of the target virtual object, and the viewing-angle adjustment operation; and displaying a target virtual scene based on the target rotation speed of the viewing angle.

In an embodiment, the at least one instruction is loaded and executed by the one or more processors 1501 to implement the following operation: obtaining, in response to a determination that the aiming point is located in the adsorption region of the target virtual object, a first rotation speed of the viewing angle of the virtual scene according to the viewing-angle adjustment operation; obtaining a second rotation speed of the viewing angle of the virtual scene according to the location of the aiming point and the location of the target virtual object, a direction of the second rotation speed being from the aiming point toward the target virtual object; and obtaining the target rotation speed of the viewing angle of the virtual scene based on the first rotation speed and the second rotation speed.

In an embodiment, the at least one instruction is loaded and executed by the one or more processors 1501 to implement the following operations: obtaining, in response to a determination that the aiming point is located in a first adsorption sub-region of the target virtual object, a first preset rotation speed of the viewing angle of the virtual scene according to the viewing-angle adjustment operation; obtaining, in response to a determination that the aiming point is located in a second adsorption sub-region of the target virtual object, a second preset rotation speed of the viewing angle of the virtual scene according to the viewing-angle adjustment operation, the second preset rotation speed being less than the first preset rotation speed; and obtaining, in response to a determination that the aiming point is located in a third adsorption sub-region of the target virtual object, a third preset rotation speed of the viewing angle of the virtual scene according to the viewing-angle adjustment operation, the third preset rotation speed being less than the first preset rotation speed, and the third preset rotation speed being different from the second preset rotation speed; and the first adsorption region surrounding the second adsorption region, and the second adsorption region surrounding the third adsorption region.

In an embodiment, the at least one instruction is loaded and executed by the one or more processors 1501 to implement the following operations: obtaining the second rotation speed of the viewing angle of the virtual scene according to a distance between projections of the target virtual object and the aiming point on a terminal screen; or obtaining the second rotation speed of the viewing angle of the virtual scene according to a distance between the target virtual object and the aiming point in the virtual scene; or obtaining the second rotation speed of the viewing angle of the virtual scene according to an angle between a direction of a line connecting a virtual object currently controlled by the terminal to the target virtual object and a direction of the aiming point.

In an embodiment, the second rotation speed is in a negative correlation with the distance between the projections of the target virtual object and the aiming point on the terminal screen; or the second rotation speed is in a negative correlation with the distance between the target virtual object and the aiming point in the virtual scene: or the second rotation speed is in a negative correlation with the angle.

In an embodiment, the at least one instruction is further loaded and executed by the one or more processors 1501 to implement the following operation: obtaining a distance between the virtual object currently controlled by the terminal and the target virtual object.

In an embodiment, the at least one instruction is loaded and executed by the one or more processors 1501 to implement the following operations: obtaining the second rotation speed of the viewing angle of the virtual scene according to the distance between the virtual object currently controlled by the terminal and the target virtual object and the distance between the projections of the target virtual object and the aiming point on the terminal screen, the second rotation speed being in a negative correlation with the distance between the virtual object currently controlled by the terminal and the target virtual object.

In an embodiment, the at least one instruction is loaded and executed by the one or more processors 1501 to implement the following operations: obtaining the second rotation speed of the viewing angle of the virtual scene according to the distance between the virtual object currently controlled by the terminal and the target virtual object and the distance between the target virtual object and the aiming point in the virtual scene, the second rotation speed being in a negative correlation with the distance between the virtual object currently controlled by the terminal and the target virtual object.

In an embodiment, the at least one instruction is further loaded and executed by the one or more processors 1501 to implement the following operations: performing, in response to a determination that the aiming point is located in a first adsorption region or a second adsorption region of the target virtual object, the operation of obtaining the second rotation speed of the viewing angle of the virtual scene according to the location of the aiming point and the location of the target virtual object; and using, in response to a determination that the aiming point is located in a third adsorption region of the target virtual object, the first rotation speed as the target rotation speed of the viewing angle of the virtual scene.

In an embodiment, the at least one instruction is loaded and executed by the one or more processors 1501 to implement the following operations: obtaining the second rotation speed of the viewing angle of the virtual scene according to the location of the aiming point, the location of the target virtual object, and an operation direction of the viewing-angle adjustment operation.

In an embodiment, the at least one instruction is loaded and executed by the one or more processors 1501 to implement the following operations: obtaining, in response to a determination that the operation direction of the viewing-angle adjustment operation indicates that the aiming point moves toward the target virtual object, a third rotation speed as the second rotation speed of the viewing angle of the virtual scene according to the location of the aiming point, the location of the target virtual object, and a first parameter; and obtaining, in response to a determination that the operation direction of the viewing-angle adjustment operation indicates that the aiming point moves in a direction opposite to the target virtual object, a fourth rotation speed as the second rotation speed of the viewing angle of the virtual scene according to the location of the aiming point, the location of the target virtual object, and a second parameter, the fourth rotation speed being less than the third rotation speed.

In an embodiment, the at least one instruction is further loaded and executed by the one or more processors 1501 to implement the following operations: obtaining a display mode of the virtual scene in response to detection of the viewing-angle adjustment operation; performing, in response to a determination that the virtual scene is in a display mode based on an aiming tool, the operation of obtaining an adsorption region of a target virtual object; and obtaining, in response to a determination that the virtual scene is not in the display mode based on an aiming tool, a first rotation speed of the viewing angle of the virtual scene according to the viewing-angle adjustment operation.

In an embodiment, the at least one instruction is further loaded and executed by the one or more processors 1501 to implement the following operations: selecting, in a case that the aiming point is located in adsorption regions of a plurality of candidate virtual objects, a candidate virtual object from the plurality of candidate virtual objects as the target virtual object; and performing, based on the selected target virtual object, the operation of obtaining a target rotation speed of a viewing angle of a virtual scene according to a location of the aiming point, a location of the target virtual object, and the viewing-angle adjustment operation.

In an embodiment, the at least one instruction is loaded and executed by the one or more processors 1501 to implement the following operations: randomly selecting a candidate virtual object from the plurality of candidate virtual objects as the target virtual object; or selecting a candidate virtual object closest to the aiming point as the target virtual object according to distances between the plurality of candidate virtual objects and the aiming point in the virtual scene; or selecting a candidate virtual object closest to the aiming point as the target virtual object according to distances between locations of projections of the plurality of candidate virtual objects and the aiming point on a terminal screen; or selecting, according to angles between directions of lines connecting the plurality of candidate virtual objects to a virtual object currently controlled by the terminal and a direction of the aiming point, a candidate virtual object with a minimum angle as the target virtual object.

In another possible implementation, the at least one instruction is loaded and executed by the processors 1501 to implement the following methods: obtaining a target region corresponding to an aiming point in response to a determination that a virtual scene is detected to switch from a first display mode to a second display mode, the second display mode being a display mode based on an aiming tool, the first display mode being another display mode than the second display mode; obtaining, in response to a determination that the target region includes a target virtual object, a target rotation direction and a target rotation angle of a viewing angle of the virtual scene according to a location of the target virtual object and a location of the aiming point; and displaying a target virtual scene based on the target rotation direction and the target rotation angle of the viewing angle, the aiming point in the target virtual scene being located in a region in which the target virtual object is located.

In an embodiment, the at least one instruction is loaded and executed by the one or more processors 1501 to implement the following operations: obtaining a target location of the target virtual object; and obtaining the target rotation direction and the target rotation angle of the viewing angle of the virtual scene according to the location of the aiming point and the target location.

In an embodiment, the at least one instruction is loaded and executed by the one or more processors 1501 to implement the following operations: obtaining the target location of the target virtual object according to a relationship between locations of projections of the aiming point and the target virtual object on a terminal screen in a horizontal direction; or obtaining the target location of the target virtual object according to a relationship between horizontal locations of the aiming point and the target virtual object in the virtual scene; or obtaining a location of a target part of the target virtual object as the target location.

In an embodiment, the at least one instruction is loaded and executed by the one or more processors 1501 to implement the following operations: using, in response to a determination that a horizontal location of a projection location of the aiming point in the horizontal direction is located in a horizontal location range of a projection location of the target virtual object in the horizontal direction, a location that is the same as the horizontal location of the aiming point and that is in the horizontal location range as the target location of the target virtual object; or using, in response to a determination that a horizontal location of a projection location of the aiming point in the horizontal direction is located outside a horizontal location range of a projection location of the target virtual object in the horizontal direction, a location on the target virtual object corresponding to the horizontal location of the aiming point or a location of the target part of the target virtual object as the target location of the target virtual object.

In an embodiment, the at least one instruction is loaded and executed by the one or more processors 1501 to implement the following operations: using a direction from the aiming point toward the target location as the target rotation direction; and using an angle between a direction of the aiming point and a direction of a line connecting the target location to a virtual object currently controlled by the terminal as the target rotation angle.

In an embodiment, the at least one instruction is loaded and executed by the one or more processors 1501 to implement the following operations: obtaining a target region using the aiming point as a center and using a preset size as a size.

In an embodiment, the at least one instruction is further loaded and executed by the one or more processors 1501 to implement the following operations: selecting, in response to a determination that the target region includes a plurality of candidate virtual objects, a candidate virtual object from the plurality of candidate virtual objects as the target virtual object; and performing, based on the selected target virtual object, the operation of obtaining a target rotation direction and a target rotation angle of a viewing angle of the virtual scene according to a location of the target virtual object and a location of the aiming point.

In an embodiment, the at least one instruction is loaded and executed by the one or more processors 1501 to implement the following operations: randomly selecting a candidate virtual object from the plurality of candidate virtual objects as the target virtual object; or selecting a candidate virtual object closest to the aiming point as the target virtual object according to distances between the plurality of candidate virtual objects and the aiming point in the virtual scene; or selecting a candidate virtual object closest to the aiming point as the target virtual object according to distances between locations of projections of the plurality of candidate virtual objects and the aiming point on a terminal screen; or selecting, according to angles between directions of lines connecting the plurality of candidate virtual objects to a virtual object currently controlled by the terminal and a direction of the aiming point, a candidate virtual object with a minimum angle as the target virtual object.

In an embodiment, the electronic device may further include components such as a wired or wireless network interface, a keyboard, and an input/output (I/O) interface, to facilitate input and output. The electronic device may further include another component configured to implement a function of a device. Details are not further described herein.

In an exemplary embodiment, a computer-readable storage medium, such as a memory 1502 including an instruction, is further provided, and the instruction may be executed by a processor to complete the virtual scene display method in the foregoing embodiments. For example, the computer-readable storage medium may be a read-only memory (ROM), a random access memory (RAM), a compact disc ROM (CD-ROM), a magnetic tape, a floppy disk, an optical data storage device, or the like.

All or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A virtual scene display method, comprising:
   obtaining an adsorption region corresponding to a location of a target virtual object such that the adsorption region moves along with movement of the target virtual object;
   obtaining, with circuitry of an electronic device, in response to a determination that an aiming point is located in the adsorption region corresponding to the location of the target virtual object, a target rotation speed of a viewing angle of a virtual scene based on a detected viewing-angle adjustment operation by applying a magnetic force toward the target virtual object based on a location of the aiming point and a location of the target virtual object, wherein, when the detected viewing-angle adjustment operation has an operation direction toward the target virtual object, the applied magnetic force is greater than a magnetic force applied when the detected viewing-angle adjustment operation has an operation direction away from the target virtual object; and
   executing the detected viewing-angle adjustment operation based on the target rotation speed of the viewing angle.

2. The method according to claim 1, wherein the obtaining, in response to the determination that the aiming point is located in the adsorption region corresponding to the location of the target virtual object, the target rotation speed comprises:
   obtaining a first rotation speed of the viewing angle of the virtual scene according to at least one of a location, strength, time, or speed of the detected viewing-angle adjustment operation;
   obtaining a second rotation speed of the viewing angle of the virtual scene according to the location of the aiming point and the location of the target virtual object; and
   obtaining the target rotation speed of the viewing angle of the virtual scene based on at least one of the first rotation speed and the second rotation speed.

3. The method according to claim 2, wherein the obtaining the first rotation speed comprises:
   obtaining, in response to a determination that the aiming point is located in a first adsorption sub-region of the target virtual object, a first preset rotation speed of the viewing angle of the virtual scene according to the detected viewing-angle adjustment operation;
   obtaining, in response to a determination that the aiming point is located in a second adsorption sub-region of the target virtual object, a second preset rotation speed of the viewing angle of the virtual scene according to the detected viewing-angle adjustment operation, the second preset rotation speed being less than the first preset rotation speed; and
   obtaining, in response to a determination that the aiming point is located in a third adsorption sub-region of the target virtual object, a third preset rotation speed of the viewing angle of the virtual scene according to the detected viewing-angle adjustment operation, the third preset rotation speed being less than the first preset rotation speed, and the third preset rotation speed being different from the second preset rotation speed;
   wherein the first adsorption sub-region surrounds the second adsorption sub-region, and the second adsorption sub-region surrounds the third adsorption sub-region.

4. The method according to claim 2, wherein the obtaining the second rotation speed comprises:
   obtaining the second rotation speed of the viewing angle of the virtual scene according to a distance between projections of the target virtual object and the aiming point on a screen; or
   obtaining the second rotation speed of the viewing angle of the virtual scene according to a distance between the target virtual object and the aiming point in the virtual scene; or
   obtaining the second rotation speed of the viewing angle of the virtual scene according to an angle between a line connecting a virtual object currently controlled by the electronic device to the target virtual object and a direction of the aiming point.

5. The method according to claim 4, wherein
   the second rotation speed is obtained according to the distance between the projections of the target virtual object and the aiming point on the screen and the second rotation speed is in a negative correlation with the distance between the projections of the target virtual object and the aiming point on the screen; or the second rotation speed is obtained according to the distance between the target virtual object and the aiming point in the virtual scene and the second rotation speed is in a negative correlation with the distance between the target virtual object and the aiming point in the virtual scene; or the second rotation speed is obtained according to the angle between the line connecting the virtual object currently controlled by the electronic device to the target virtual object and the direction of the aiming point and the second rotation speed is in a negative correlation with the angle.

6. The method according to claim 4, wherein the method further comprises:

obtaining a distance between the virtual object currently controlled by the electronic device and the target virtual object; and wherein the second rotation speed is obtained according to the distance between the virtual object currently controlled by the electronic device and the target virtual object and according to the distance between the projections of the target virtual object and the aiming point on the screen, the second rotation speed being in a negative correlation with the distance between the virtual object currently controlled by the electronic device and the target virtual object; or the second rotation speed is obtained according to the distance between the virtual object currently controlled by the electronic device and the target virtual object and according to the distance between the target virtual object and the aiming point in the virtual scene, the second rotation speed being in a negative correlation with the distance between the virtual object currently controlled by the electronic device and the target virtual object.

7. The method according to claim 2, wherein the obtaining the target rotation speed further comprises:

in response to a determination that the aiming point is located in a first adsorption sub-region or a second adsorption sub-region of the adsorption region of the target virtual object, obtaining the second rotation speed as the target rotation speed according to the location of the aiming point and the location of the target virtual object; and in response to a determination that the aiming point is located in a third adsorption sub-region of the adsorption region of the target virtual object, obtaining the first rotation speed as the target rotation speed of the viewing angle of the virtual scene.

8. The method according to claim 2, wherein the obtaining the second rotation speed comprises:

obtaining the second rotation speed of the viewing angle of the virtual scene according to the location of the aiming point, the location of the target virtual object, and an operation direction of the detected viewing-angle adjustment operation.

9. The method according to claim 8, wherein the obtaining the second rotation speed comprises:

obtaining, in response to a determination that the operation direction of the detected viewing-angle adjustment operation indicates that the aiming point moves toward the target virtual object, a third rotation speed as the second rotation speed of the viewing angle of the virtual scene according to a first parameter used to determine the third rotation speed based on the location of the aiming point and the location of the target virtual object; and obtaining, in response to a determination that the operation direction of the detected viewing-angle adjustment operation indicates that the aiming point moves in a direction away from the target virtual object, a fourth rotation speed as the second rotation speed of the viewing angle of the virtual scene according to a second parameter used to determine the fourth rotation speed based on the location of the aiming point and the location of the target virtual object, the fourth rotation speed being less than the third rotation speed.

10. The method according to claim 1, wherein the method further comprises:

obtaining a display mode of the virtual scene in response to detecting that the viewing-angle adjustment operation is received;

performing, in response to a determination that the virtual scene is in a display mode based on an aiming tool, the obtaining the adsorption region of the target virtual object; and obtaining, in response to a determination that the virtual scene is not in the display mode based on the aiming tool, a first rotation speed of the viewing angle of the virtual scene according to the detected viewing-angle adjustment operation.

11. The method according to claim 1, wherein the method further comprises:

selecting, in response to a determination that the aiming point is located in adsorption regions of a plurality of candidate virtual objects, a candidate virtual object from the plurality of candidate virtual objects as the target virtual object; and performing, based on the selected target virtual object, the obtaining the target rotation speed of the viewing angle of the virtual scene according to the location of the aiming point, the location of the target virtual object, and the detected viewing-angle adjustment operation.

12. The method according to claim 11, wherein the selecting comprises:

randomly selecting the candidate virtual object from the plurality of candidate virtual objects as the target virtual object; or selecting the candidate virtual object closest to the aiming point as the target virtual object according to distances between the plurality of candidate virtual objects and the aiming point in the virtual scene; or selecting the candidate virtual object closest to the aiming point as the target virtual object according to distances between locations of projections of the plurality of candidate virtual objects and the aiming point on a screen; or selecting, according to angles between directions of lines connecting the plurality of candidate virtual objects to a virtual object currently controlled by the electronic device and a direction of the aiming point, the candidate virtual object with a minimum angle as the target virtual object.

13. An electronic device, comprising:

processing circuitry configured to:

obtain, an adsorption region corresponding to a location of a target virtual object such that the adsorption region moves along with movement of the target virtual object;

obtain, in response to a determination that an aiming point is located in the adsorption region corresponding to the location of the target virtual object, a target rotation speed of a viewing angle of a virtual scene based on a detected viewing-angle adjustment operation by applying a magnetic force toward the target virtual object based on a location of the aiming point and a location of the target virtual object wherein, when the detected viewing-angle adjustment operation has an operation direction toward the target virtual object, the applied magnetic force is greater than a magnetic force applied when the detected viewing-angle adjustment operation has an operation direction away from the target virtual object; and executing the detected viewing-angle adjustment operation based on the target rotation speed of the viewing angle.

14. The device according to claim 13, wherein the processing circuitry is further configured to:

obtain a first rotation speed of the viewing angle of the virtual scene according to at least one of a location, strength, time, or speed of the detected viewing-angle adjustment operation;

obtain a second rotation speed of the viewing angle of the virtual scene according to the location of the aiming point and the location of the target virtual object; and obtain the target rotation speed of the viewing angle of the virtual scene based on at least one of the first rotation speed and the second rotation speed.

15. The device according to claim 14, wherein the processing circuitry is further configured to:

obtain, in response to a determination that the aiming point is located in a first adsorption sub-region of the target virtual object, a first preset rotation speed of the viewing angle of the virtual scene according to the detected viewing-angle adjustment operation;

obtain, in response to a determination that the aiming point is located in a second adsorption sub-region of the target virtual object, a second preset rotation speed of the viewing angle of the virtual scene according to the detected viewing-angle adjustment operation, the second preset rotation speed being less than the first preset rotation speed; and obtain, in response to a determination that the aiming point is located in a third adsorption sub-region of the target virtual object, a third preset rotation speed of the viewing angle of the virtual scene according to the detected viewing-angle adjustment operation, the third preset rotation speed being less than the first preset rotation speed, and the third preset rotation speed being different from the second preset rotation speed, wherein the first adsorption sub-region surrounds the second adsorption sub-region, and the second adsorption sub-region surrounds the third adsorption sub-region.

16. The device according to claim 14, wherein the processing circuitry is further configured to:

obtain the second rotation speed of the viewing angle of the virtual scene according to a distance between projections of the target virtual object and the aiming point on a screen; or obtain the second rotation speed of the viewing angle of the virtual scene according to a distance between the target virtual object and the aiming point in the virtual scene; or obtain the second rotation speed of the viewing angle of the virtual scene according to an angle between a line connecting a virtual object currently controlled by the electronic device to the target virtual object and a direction of the aiming point.

17. The device according to claim 16, wherein the second rotation speed is obtained according to the distance between the projections of the target virtual object and the aiming point on the screen and the second rotation speed is in a negative correlation with the distance between the projections of the target virtual object and the aiming point on the screen; or the second rotation speed is obtained according to the distance between the target virtual object and the aiming point in the virtual scene and the second rotation speed is in a negative correlation with the distance between the target virtual object and the aiming point in the virtual scene; or the second rotation speed is obtained according to the angle between the line connecting the virtual object currently controlled by the electronic device to the target virtual object and the direction of the aiming point and the second rotation speed is in a negative correlation with the angle.

18. The device according to claim 16, wherein the processing circuitry is further configured to:

obtain a distance between the virtual object currently controlled by the electronic device and the target virtual object, and wherein the second rotation speed is obtained according to the distance between the virtual object currently controlled by the electronic device and the target virtual object and according to the distance between the projections of the target virtual object and the aiming point on the screen, the second rotation speed being in a negative correlation with the distance between the virtual object currently controlled by the electronic device and the target virtual object; or the second rotation speed is obtained according to the distance between the virtual object currently controlled by the electronic device and the target virtual object and according to the distance between the target virtual object and the aiming point in the virtual scene, the second rotation speed being in a negative correlation with the distance between the virtual object currently controlled by the electronic device and the target virtual object.

19. The device according to claim 14, wherein the processing circuitry is further configured to:

in response to a determination that the aiming point is located in a first adsorption sub-region or a second adsorption sub-region of the adsorption region of the target virtual object, obtain the second rotation speed as the target rotation speed according to the location of the aiming point and the location of the target virtual object; and in response to a determination that the aiming point is located in a third adsorption sub-region of the adsorption region of the target virtual object, obtain the first rotation speed as the target rotation speed of the viewing angle of the virtual scene.

20. A non-transitory computer-readable storage medium storing computer-readable instructions thereon, which, when executed by processing circuitry, cause the processing circuitry to perform a virtual scene display method comprising:

obtaining an adsorption region corresponding to a location of a target virtual object such that the adsorption region moves along with movement of the target virtual object;

obtaining, in response to a determination that an aiming point is located in the adsorption region corresponding to the location of the target virtual object, a target rotation speed of a viewing angle of a virtual scene based on a detected viewing-angle adjustment operation by applying a magnetic force toward the target virtual object based on a location of the aiming point, and a location of the target virtual object, wherein, when the detected viewing-angle adjustment operation has an operation direction toward the target virtual object, the applied magnetic force is greater than a magnetic force applied when the detected viewing-angle adjustment operation has an operation direction away from the target virtual object; and executing the detected viewing-angle adjustment operation based on the target rotation speed of the viewing angle.

* * * * *